(12) United States Patent
Salkini et al.

(10) Patent No.: US 7,460,866 B2
(45) Date of Patent: Dec. 2, 2008

(54) POSITION LOCATION FOR AIRBORNE NETWORKS

(75) Inventors: Jay Salkini, Clarksville, MD (US); Thomas V. Joseph, III, Lothian, MD (US)

(73) Assignee: Tecore, Inc., Columbia, MD (US)

( * ) Notice: Subject to any disclaimer, the term of this patent is extended or adjusted under 35 U.S.C. 154(b) by 0 days.

(21) Appl. No.: 11/206,082

(22) Filed: Aug. 18, 2005

(65) Prior Publication Data

US 2007/0042772 A1 Feb. 22, 2007

(51) Int. Cl.
*H04Q 7/20* (2006.01)

(52) U.S. Cl. .................... 455/431; 455/430; 455/432.1; 455/456.1; 455/427; 455/428; 342/357.01; 342/357.06; 342/357.08; 342/357.1; 340/945; 340/963; 340/970; 340/973

(58) Field of Classification Search ................. 455/430, 455/431, 432.1, 427, 428, 429, 456.1, 456.2, 455/456.3, 456.4, 456.5, 456.6, 414.1, 432.2, 455/432.3, 417; 340/945, 961, 963, 970, 340/971, 973, 977, 979, 982, 988, 946; 342/357.1, 342/352, 356, 357.01, 357.06, 357.08, 357.11, 342/29

See application file for complete search history.

(56) References Cited

U.S. PATENT DOCUMENTS

| | | | | |
|---|---|---|---|---|
| 5,243,652 A | * | 9/1993 | Teare et al. | 380/250 |
| 5,995,833 A | * | 11/1999 | Zicker | 455/430 |
| 6,281,797 B1 | * | 8/2001 | Forster et al. | 340/572.3 |
| 6,603,967 B1 | * | 8/2003 | Sinivaara et al. | 455/431 |
| 6,788,935 B1 | * | 9/2004 | McKenna et al. | 455/431 |
| 6,799,094 B1 | * | 9/2004 | Vaida et al. | 701/3 |
| 6,889,042 B2 | * | 5/2005 | Rousseau et al. | 455/431 |
| 2004/0198346 A1 | * | 10/2004 | Swensen et al. | 455/431 |
| 2004/0246145 A1 | * | 12/2004 | Andrews et al. | 340/971 |
| 2005/0171653 A1 | * | 8/2005 | Taylor | 701/13 |
| 2006/0270354 A1 | * | 11/2006 | de La Chapelle et al. | 455/66.1 |

FOREIGN PATENT DOCUMENTS

WO    WO 2004063766 A1  *  7/2004

* cited by examiner

*Primary Examiner*—Charles N Appiah
*Assistant Examiner*—Olumide T Ajibade Akonai
(74) *Attorney, Agent, or Firm*—Andrews Kurth LLP

(57) ABSTRACT

A wireless communications system, and a corresponding method, for use with an aircraft, includes airborne pico cell base stations mounted on the aircraft, the base stations capable of communication with wireless devices used by subscribers on the aircraft via using switching/transaction processing equipment located optionally on the aircraft or in the ground network with one or more ground-based networks. The system includes aircraft location equipment, in communication with the base stations, that determine the aircraft's location, including latitude, longitude, altitude, and other relevant data. Finally, the system includes a wireless communications enable/disable module that receives the aircraft's location and enables and disables wireless communications through the base stations based on the aircraft's location.

44 Claims, 16 Drawing Sheets

POSITION LOCATION FOR AIRBORNE NETWORKS

TECHNICAL FIELD

The technical field is systems and methods to establish a location of a user connected to an airborne network.

BACKGROUND

Position location is a key aspect of today's wireless network technology. A variety of methods and systems exist to determine a subscriber's location with varying degrees accuracy. These systems and methods use either land-based equipment or geo-positioning satellites (GPS), or a combination of both, to receive signals for the subscriber's handset, and thus fix the position of the subscriber. In addition to GPS, other examples include Time of Arrival and Angle of Arrival (and combinations thereof) to triangulate the subscriber's handset.

Older, but still used, position location technology relies on cell or sector identity to provide the general location of the subscriber. Current cell sites are fixed in relation to ground, and therefore the location of the cell can be determined based on a cell ID provided by the subscriber's handset. The cell ID is cross-referenced with a known position database and coverage area to complete the subscriber's position location determination. While this older position location information is easy to obtain, the size of most cells/sectors is such that the subscriber's location cannot be determined with sufficient precision for many current applications.

All of these existing position location methods and systems provide a predictable position location solution provided the wireless network is on the ground and the cell sites and locations are fixed relative to ground. These methods and systems will not, however, work when the subscriber is airborne, such as in an airplane.

SUMMARY

What is disclosed is a wireless communications system for use with an aircraft, comprising an airborne pico cell base station and associated on board equipment mounted on the aircraft, the base station capable of communication with wireless devices used by subscribers on the aircraft and with onboard or ground-based equipment that communicates with one or more ground-based networks; aircraft location equipment in communication with the base station, wherein the aircraft's location, comprising latitude, longitude, and altitude, are determined; and a wireless communications enable/disable module that receives the aircraft's location and enables and disables wireless communications through the base station based on the aircraft's location.

Also disclosed is a position location system for an airborne wireless communications network, comprising means for routing wireless communications between wireless handsets onboard an aircraft and ground-based facilities; means for locating the aircraft; and means for enabling the wireless communications between the routing means and the handsets.

Still further what is disclosed is a wireless communications method for wireless communications between wireless handsets onboard an aircraft and ground-based devices, comprising determining a location of the aircraft; providing the location to a wireless communications enabling device; based on the provided location, enabling wireless communications with an airborne base station; receiving, at the airborne base station, a wireless call-setup from a wireless handset onboard the aircraft; and establishing wireless communications between the handset and a device external to the aircraft.

In addition, what is disclosed is a method for establishing aircraft position location for use in an airborne network, comprising sending an aircraft location request to an aircraft; determining a location of the aircraft; providing the location to a wireless communications enabling device; and based on the provided location, enabling wireless communications with an airborne base station.

DESCRIPTION OF THE DRAWINGS

The detailed description will refer to the following drawings in which like numerals refer to like items, and in which.

DETAILED DESCRIPTION

Figure 1A:
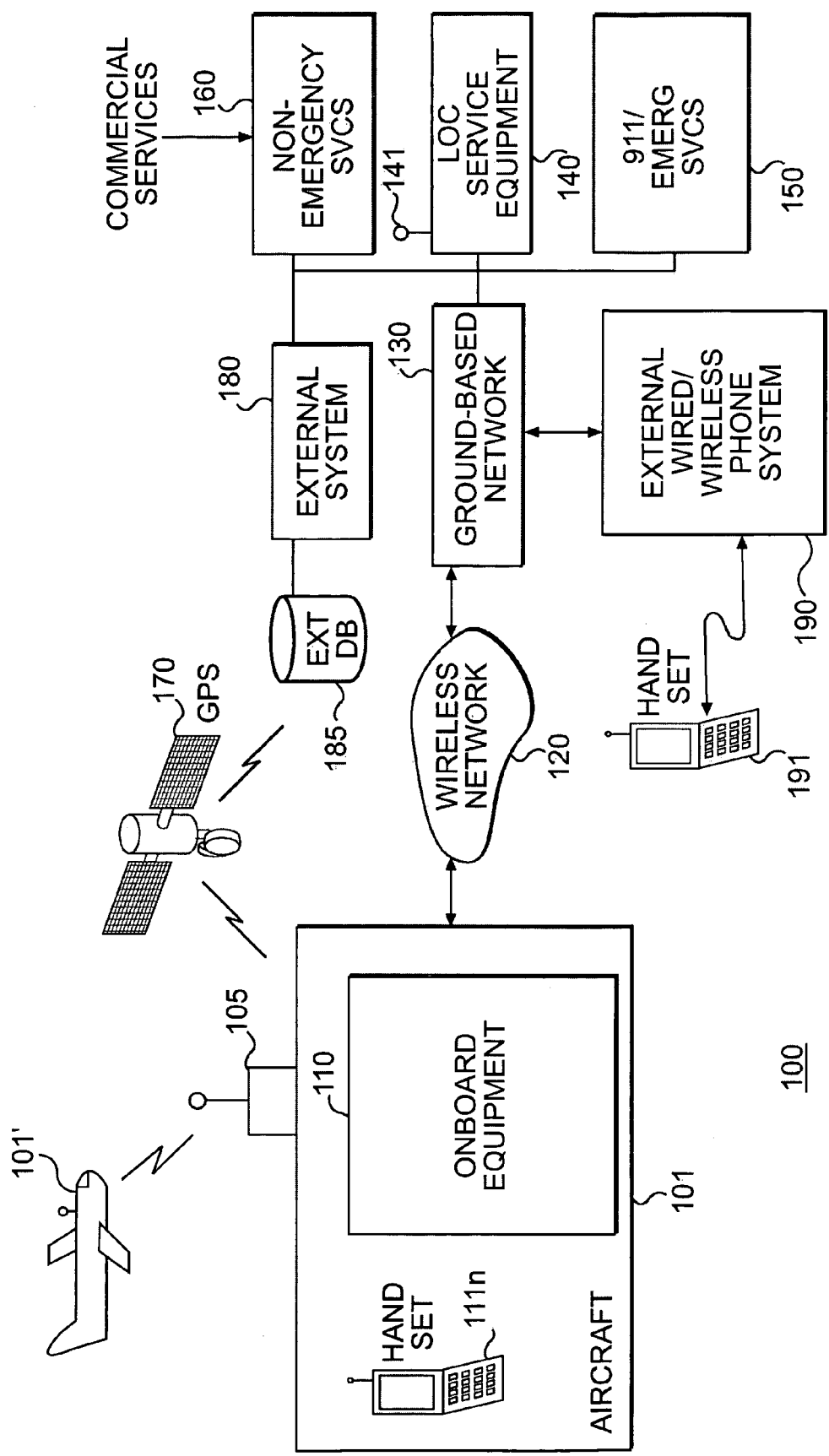
FIG. 1A is a block diagram of an embodiment of a position location system for an airborne wireless network.

Described herein are an improved means, and a corresponding method, for locating a subscriber in a wireless communications network. As used herein, a subscriber's location will generally refer to a location of the subscriber's wireless communications device, since, when in use, the device and the subscriber typically are co-located. Furthermore, as used herein, the term wireless communications device will refer to a device used for transfer of voice and/or data using various wireless frequency ranges mandated by the Federal Communications Commission (FCC) or a similar agency. Additionally, the term wireless communications device shall also refer to a device used for transfer of voice and/or data using any unlicensed frequency band for communications.

Such devices include hand-held phones, car phones, notebook computers, personal digital assistants, pen-based computers, palm-top computers, pagers, hand-held e-mail devices (such as those produced under the Blackberry™ brand), and portable data collection devices (referred to hereafter as hand sets). As one of ordinary skill in the art will appreciate, the position technology described herein will also be applicable for use in later developed devices.

Although the majority of cellular traffic has traditionally been voice communications, the relative proportion of traffic that comprises data, text, and video is increasing. The position location systems and methods described herein apply equally to these types of messaging and data services. The term data shall include all non-voice communications (video, messaging, data).

The radio spectrum used for wireless communications comprises many bands that are allocated and used for commercial, personal, and military use. In the United States, fifty (50) MHz of spectrum is allocated to cellular networks in the 824-849 MHZ and the 869-894 MHz bands. This spectrum has been allocated into two 25 MHz bands and has generally been allocated to very large service providers. Other bands of spectrum have been allocated for wireless communications. PCS is a wireless communications network that operates at a radio frequency of 1.9 GHz. This spectrum has been subdivided into three 30 MHz and three 10 MHz bands that are used by both large service providers and many new, more innovative service providers. Additionally, unlicensed frequency bands have been allocated for wireless communications commonly referred to as WiFi (802.11). These bands are also used for wireless communications. Internationally, other frequencies and bands have been allocated for licensed wireless communications. These are applicable to the claims of this patent.

Several types of network access are available in the United States including, without limitation: Advanced Mobile Phone Systems (AMPS), Time Division Multiple Access (TDMA) (in two formats), Code Division Multiple Access (CDMA), and Global System for Mobile Communications (GSM). AMPS is the cellular standard that has been extensively deployed in North America and has been commercially available since 1983. The current cellular standard describing access methods to the network is IS-553. This standard divides 50 MHz of spectrum into 832 frequency channels, each 30 KHz wide. Various organizations, such as the Portable Computer and Communications Association (PCCA), modem manufacturers, computer manufactures, and service providers, have worked together in defining the IS-533 interoperability standard.

TDMA is a digital access method that allocates time slots to different users, allowing them to share similar radio frequency channels. TDMA divides each frequency channel into six time slots and allocates two slots to each user. This time division of the carrier signal increases the network capacity by 300 percent. Standard IS-54, currently upgraded to IS-136, describes a dual mode network access method allowing mobile units the choice of using TDMA or AMPS operation.

CDMA sends multiple messages over the same wide frequency channel that is decoded at the receiving end. Each mobile unit in a cell is assigned a different spreading sequence. This allows multiple users to share the same frequency spectrum. The use of CDMA increases network capacity by an order of magnitude (a factor of ten). CDMA network access standards are specified in standard IS-95, CDMA 2000, and other third generation standards, which is incorporated herein by reference. CDMA digital access methods offer superior performance in terms of higher capacity, improved voice quality, encryption for communication privacy, and integration with digital terrestrial networks.

GSM is a digital access method that allocates time slots to different users allowing them to share the radio frequency. GSM operates in similar fashion to TDMA, however the frequencies are wider and divided into a higher number of timeslots (8). The GSM standards have been adopted the world over and provide the most common type of wireless technology in the world today.

There are a number of other wireless applications that may be used in conjunction with wireless telephony or separately: digital communications such as CDMA; cordless telephones; paging; specialized mobile radio (SMR); and satellite communications. Networks based on digital communications typically have a greater capacity than analog networks for carrying voice and data traffic than analog networks.

Additionally, many new wireless communications are being introduced for what is termed the third and forth generation of wireless communications. These are technologies that define alternative means and in some cases frequency bands for access to wireless communications. All of these technologies are applicable to the methods and technologies disclosed in this document. Examples of such technologies include those governed by IEEE Standards 802.11, 802.16, and Universal Mobile Telecommunications Services (UMTS), for example.

Position technology is used in conjunction with today's wireless communications devices for a variety of purposes, including providing services to subscribers based on their location. Current technologies used in today's wireless networks typically provide position location of handsets. These technologies include:

Handset GPS—Handset based global positioning involves direct communication between a handset and a GPS satellite. For this technology to work, the handset must be able to "see" the satellite. This technology provides a latitude and longitude that is sent to the wireless network from the subscriber's handset.

Angle of Arrival—This technology implies knowledge of the angle at which a signal is arriving at a base station or cell site, and the triangulation of the comparative signal measurements with one or two other sites. The processing of this data provides a latitude and longitude that is sent to the wireless network from the location processing equipment at the cell site.

Time of Arrival (TOA)—This technology uses a time differential of a signal arrival combined with comparative data from one or two other sites to triangulate. The processing of this data produces a latitude and longitude that is sent to the wireless network from the location processing equipment. In one TOA method, a mobile phone transmits a prescribed message signal to at least three adjacent base stations, thus determining the distance between the mobile phone and each respective base station using the transmission time of the message signal. Calculating a radial distance between the mobile phone and three base stations provides an accurate fix, as the intersection of the three spheres. However, in this case, the mobile phone should be provided with the means for transmitting the prescribed message to the base stations.

Another TOA method involves a round trip delay (RTD), which uses a prescribed message transmitted from the base station to the mobile phone and measures the time it takes to complete a round-trip for the prescribed message to return back to the base station. However, in this case, radio waves of the message are subjected to various microwave obstructions, such as buildings, thus the RTD inherently includes a delay resulting from reflection by such obstructions. This type of delay degrades the accuracy of locating the exact position of a mobile phone.

Predictive Location Based on Handoff Data—Using data collection over time used for handoff processing, the subscriber's location is determined based on similarity of the handover characteristics the subscriber experiences.

Cell Site Identity—This technology simply uses the cell site as the identifier for the subscriber's location. The fixed cell site location is cross-referenced with a database of cell site locations.

These position location technologies may work well for ground-based handsets. However, when the handset is on an airborne platform (aircraft), because of the aircraft's movement (latitude, longitude, and altitude), the same technologies become unworkable. Considering GPS, the inconsistent view of GPS from a handset inside an aircraft does not provide a reliable reference that can be transmitted to the ground-based wireless network infrastructure. Any technology requiring triangulation of the handset, such as Angle of Arrival and Time of Arrival, fails in a single cell airborne network. Predictive location based on handoff data is not relevant in a single or even multi-cell network of the aircraft. Because the cell site (aircraft) is traveling at a high rate of speed, any relation to ground based cell sites is irrelevant. Finally, use of cell site identity is unworkable without additional data. That is, the cell site identity provides the identity of the aircraft but no information relative to its current position.

In the airborne network disclosed herein, an aircraft contains a cell site or multiple cell sites that support one or more technologies. As noted above, one important difference between this airborne network and a typical ground-based wireless network is that the aircraft's cell site(s) as well as the subscriber move at the speed of the aircraft. As a result, current location technology that rely on data from the handset relative to fixed sites or to a deterministic site location no longer applies. To overcome limitations of current technology, the airborne network, and associated position location equipment, described herein coordinate data from a combination of location technologies that uses available communications and data on board the aircraft or provided by an external system to determine the subscriber's location at the time of the call. The resulting position information can be routed to an appropriate service center to handle the call. This data not only takes into account the subscriber's location based on a cell (aircraft identification), but also accounts for the motion of the aircraft.

One aspect of the airborne network is a call processing and/or session/transaction processing entity that uses the location of the subscriber on the aircraft to determine: 1) the service to provide, and 2) whether or not the service can be provided. As noted above, the underlying assumption is that the subscriber's location coincides with that of the aircraft. An indication of a service trigger initiates a request to equipment located on the aircraft and/or related equipment on the ground for a relative position of the subscriber requesting the service. The position information is transferred using communications between the aircraft and the equipment on the ground or obtained from a separate system. This information is then incorporated with the service to provide a targeted application to the subscriber.

Position location solutions for wireless networks, as mandated by the FCC, must be capable of locating a subscriber within 125 meters 67 percent of the time (network based position location solutions) of the subscriber's actual position. Since the largest commercial aircraft (Airbus A380) has a length of about 73 meters, the worst-case location in the aircraft for a passenger will always be within the limit (125 meters) prescribed by the FCC, assuming the aircraft is accurately located. Handset based accuracy requirements prescribed by the FCC mandate 50 meter accuracy 67 percent of the time. Though handset based solutions are not practical from the interior of the aircraft, the majority of aircraft are under 50 meters in length. Therefore the aircraft's location may be used as the location of the subscriber. In most cases this location is equal to or better than the performance of the location based systems on the ground. The location includes the latitude and longitude of the aircraft. In some cases of service provisioning will also require the altitude of the aircraft as part of the relevant information. If additional information is available relative to the position of the aircraft that is obtained through either aircraft equipment or a separate system, this information may be used as additional input to provide an aircraft and subsequently a subscriber location.

The path of communications for location information to be sent from the plane to the ground network may use air to ground communications and/or air to satellite based communications to transmit the information. The information may be sent over a previously established communications path or may establish its own communications path for information exchange. The location information may be sent to the call processing entity or a separate system.

The location information received is used in conjunction with other information to provide the particular service. The location in and of itself is a limited piece of information. However, when combined with a type of call or information request can be used as a valuable determining factor to narrow the scope and location of the response information provided.

The location of the aircraft may be obtained periodically, on demand, or a combination thereof depending on the implementation and or the type of service. The most relevant data shall be used.

The location may be obtained from the aircraft via an intermediary database or network or may be retrieved directly from the onboard aircraft equipment. There are several sources of location information that may contribute to providing the complete information from the aircraft:

Onboard base station antenna equipment

Aircraft instrumentation and equipment including GPS and other relevant inputs including but not limited to satellite, radar, TACAN, etc.

Subscriber handsets

External GPS input

External database or network

For any of the applications discussed in this document, any of the methods and or sources of obtaining the location information can be applicable.

Current regulations limit the operations of electronic equipment on board an aircraft to a specific time and/or altitude. Additional regulations limit the types of electronic devices that can be used. Access to ground based services is limited to the subscriber equipment installed on the aircraft for general access if access is possible at all.

When subscribers are allowed to use their own personal equipment to transmit and access ground based services, there must be a method to control the time and place that these services are accessible. This can be accomplished by using the aircraft location to determine the appropriate time to enable and disable services on board. Using the combination of latitude, longitude, and altitude, and other relevant location and timing data enabling services on the aircraft can be controlled remotely or locally on board based on the relative position of the aircraft. The addition of altitude can be used as an input for determining service accessibility. For example, service may not be accessible while the aircraft is on the ground. However another aircraft flying above the service floor altitude over the same location should be able to continue operations.

Service may be disabled in at least two ways:

Full radio frequency (RF) shutdown—One option for service shutdown is a complete disabling of the RF transmission and reception.

Service Barring—Another option for service shutdown is a denial of service access but a continuation of RF transmission. This option has the benefit of "locking" the subscribers to the system but disabling the subscriber's ability to obtain access to ground-based communications.

Other methods of partial service or selective service blocking are also possible based on the relative position of the aircraft. For example, the system may be configured such that only emergency (e.g., 911) call are connected. As another example, only aircraft crew members are allowed to use the wireless service.

In addition to the services offered for emergency calls, and for service determination, other location-based applications will be able to function onboard the aircraft. The basic concept of the plane location representing the subscriber location still applies. Other potential services could push or pull data from the subscriber or device based on the location:

- The position of the subscriber's aircraft could be used for the arrangement of ground-based transportation and other services eliminating the need to wait for an airline to update a message board or Internet site.
- The location of the aircraft can also be connected to the service provided on board. When combined with the ability to turn on or off service in the cabin based on location, the aircraft can now control the usage and the accessibility of services.
- Vendors can use the subscriber's pending arrival to send out greetings and other advertisements to attract the business of the consumer.
- This technology and concept can be extended to RFID and the tracking of packages, providing a more exact location and arrival time determination.
- Other applications as possible through the use of location identification in an airborne network.

FIG. 1A is a block diagram of a position location system 100 for airborne wireless communications. The system 100 includes aircraft 101, wireless communications network 120, which couples the aircraft 101 to ground-based network 130, and a series of application servers. These servers include the location services server 140, emergency services server 150, and non-emergency services server 160. The emergency server 150, and the servers 140 and 160, may communicate with the ground-based network 130 using any recognized communications means, including wireless and wired communication means.

The aircraft 101 includes GPS antenna 105, which communicates with GPS 170, onboard equipment 110, in communication with the ground-based network 130 through the wireless network 120, and one or more subscriber wireless communication devices (hereafter handsets) 111n.

The system 100 may also include external location system 180, external database 185, and external wired and wireless phone system 190.

Since onboard equipment 110 and the handsets 111n are all located on the aircraft 101, these components will, naturally, travel at the same speed and altitude as the aircraft 101. As will be discussed later with reference to FIGS. 1B and 1C, the onboard equipment 110 may include position location equipment for the aircraft 101 and base station equipment including one or more pico-cell base stations. The location of the handsets 111n will be within a known maximum distance of the onboard equipment 110 (and the pico-cell base stations), which for the largest commercial aircraft is about 100 meters.

The ground-based network 130 includes means to receive wireless communications from and send wireless communications to the aircraft 101. The ground-based station 130 may also communicate using the wireless spectrum with other wireless systems, such as the system 190. In an embodiment, wireless communication with the aircraft 101 allows the ground-based network 130 to initiate and suspend wireless service with the base stations within the onboard equipment 110. The equipment to initiate and suspend wireless communications may reside and/or be controlled on board the aircraft 101, and may function automatically or based on onboard crew controls.

More specifically, when subscribers are allowed to use their own personal handsets 111n (as opposed to aircraft-provided wireless communications devices) to transmit and access ground-based services, and when the ground-based network 130 includes means for controlling the time and place that these services are accessible, then the ground-based network 130 may enable and disable wireless service to and from the aircraft 101. This enabling and disabling function can be accomplished by using the aircraft location, and/or other flight-related parameters, to determine the appropriate time to enable and disable onboard wireless services. Using a combination of latitude, longitude, and altitude, enabling wireless services on the aircraft 101 can be controlled remotely from the ground-based network 130 based on the relative position of the aircraft 101. For example, service may not be accessible while the aircraft 101 is on the ground. However another aircraft flying above the service floor altitude over the same location should be able to continue operations.

Service disabling may come in several forms. Using full radio frequency (RF) shutdown, the ground-based network 130 completely disables RF transmission and reception. With full RF shutdown, the subscribers' handsets 111n are not able to communicate with the onboard equipment 110. However, the subscribers could use their handsets 111n to attempt wireless communications that bypass the onboard equipment 110. In other words, the subscriber could still communicate directly with some other ground-based wireless network. Such communications can interfere with normal aircraft communications and navigation functions. Alternatively, using service barring, the ground-based network 130 denies wireless service access but allows RF transmission with the onboard equipment 110. This service barring has the benefit of "locking" the subscribers' handsets 111n to the system 100 (and the onboard equipment 110) but disabling the subscribers' ability to directly access ground-based wireless communications systems. That is, with service barring, the subscribers' handsets 111n will tend to lock onto the onboard equipment 110 and operate at a low power level, rather than operating at a high power level in search of another receptive ground-based wireless network.

It is also possible to provide service to a limited number of subscribers such as captain and crew while the service for the passenger population is disabled. For example, crew members may have their handsets 111n registered in a database of devices that are allowed wireless service at all times.

The location services application server 140 receives aircraft location information from the onboard equipment 110 by way of the ground-based network 130. The server 140 also includes antenna 141 for querying the GPS 170 as to the aircraft's location. Finally, the server 140 can receive aircraft location information for other external sources, such as the external system 180.

The emergency server 150 provides emergency call (e.g., a 911 call) functionality to the system 100. Thus, a subscriber onboard the aircraft 101 can make an emergency 911 call and may be coupled to an appropriate emergency 911 service. Even if wireless service is disabled onboard the aircraft 101, should a subscriber place a 911 call, the system 100 may be configured to immediately enable wireless communications to allow the emergency 911 call to be completed. Alternatively, a pilot or other crew member may be notified when an emergency call is initiated, and may operate a wireless service override (if required) to enable wireless communications so that the emergency 911 call is established. Note that 911 is just one of the dialing combinations used to process emergency calls. Other types of emergency access and/or calls are also possible through this method. For example, 112 is the code used in Europe for emergency access.

The non-emergency services application server 160 couples various commercial services to the ground-based network 130 so that these services are made available to subscribers onboard the aircraft 101, in the event the subscribers place call to the services, and to allow the services to push information to individual subscribers or groups of subscribers, based on the aircraft's current location and/or other flight- or aircraft-related information.

The external location system 180 is used to track the aircraft's location and to maintain a history of the location in external database 185. The database 185 also may contain the aircraft's flight plan, passenger manifest, weather conditions along the flight path, and other information that may be useful in providing emergency and non-emergency services. Aircraft location inputs to the external system 180 include the aircraft's posted flight plan, inputs from external instruments such as radar, TACAN, GPS, and other sources. The external system 180 also includes appropriately programmed processors to correlate the input aircraft location information in order to determine a "best fit" aircraft track. The external system 180 may use the aircraft track to predict future positions of the aircraft 101, and may provide this predicted location to the location services server 140.

The external wired/wireless phone system 190, which services wireless handsets 191 and wired communications devices (not shown) is coupled to the ground-based network 130 to receive wireless communications from the handsets 111n, and to send wireless communications to the handsets 111n, when wireless communications are enabled at the onboard equipment 110. In addition to the external wireless phone system 190, other wired and wireless communications means, such the PSTN, wireless and wired data transmission systems, and other systems for sending and receiving voice, text, and data can be coupled to the ground-based network 130. Thus, when wireless communications are enabled, a subscriber onboard the aircraft has as many wireless communications options as the same subscriber would have when located on the ground.

Figure 1B:
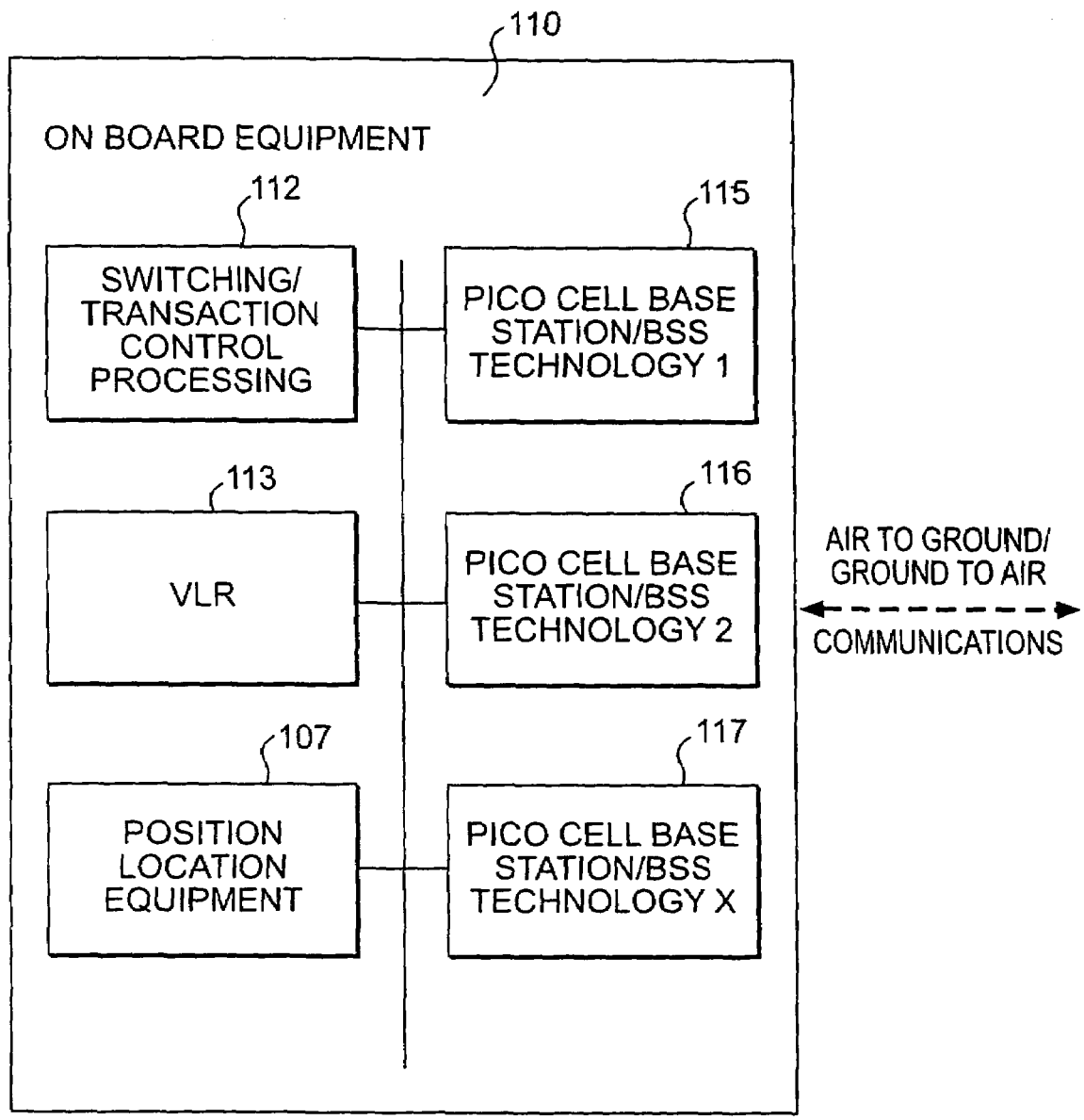
FIG. 1B is a block diagram of an embodiment of the onboard equipment used with the system of FIG. 1A.

FIG. 1B illustrates an embodiment of equipment that may be installed on the aircraft 101 to provide position location information in conjunction with the airborne communications network 100. In FIG. 1B, the onboard equipment 101 includes switching/transaction control processing module 112, visitor location register (VLR) 113, onboard position location equipment 107, and pico cell base stations 115-117. The switching/transaction control processing module 112 provides the interface, protocol processing and voice/data processing required for operation of the base stations onboard the aircraft 101. The VLR 113 contains the profile information of the active subscriber devices (i.e., the handsets 111n) on the system 100. This may exist as a local proxy or presence server or in the standard wireless VLR function. The position location equipment 107 provide the accurate representation of the aircraft's current position. The pico cell base station/ BSS Technology 1 (115) is the first BSS technology installed on the aircraft 101. The pico cell base station/BSS Technology 2 (116) is the second BSS technology installed on the aircraft 101. The pico cell base station/BSS Technology X (117) is the Xth BSS technology installed on the aircraft 101. The above reference to pico cell base stations 115-117 is meant to represent that as many wireless technologies as required can be installed on the aircraft 101. Thus, the aircraft 101 may include a pico cell base station for every wireless technology, in which case, the aircraft 101 would have more than three pico cell base stations installed. Also, any size base station may be used with the aircraft 101. However, economic factors and the size/weight considerations will most likely drive the use of pico cell base station equipment.

Figure 1C:
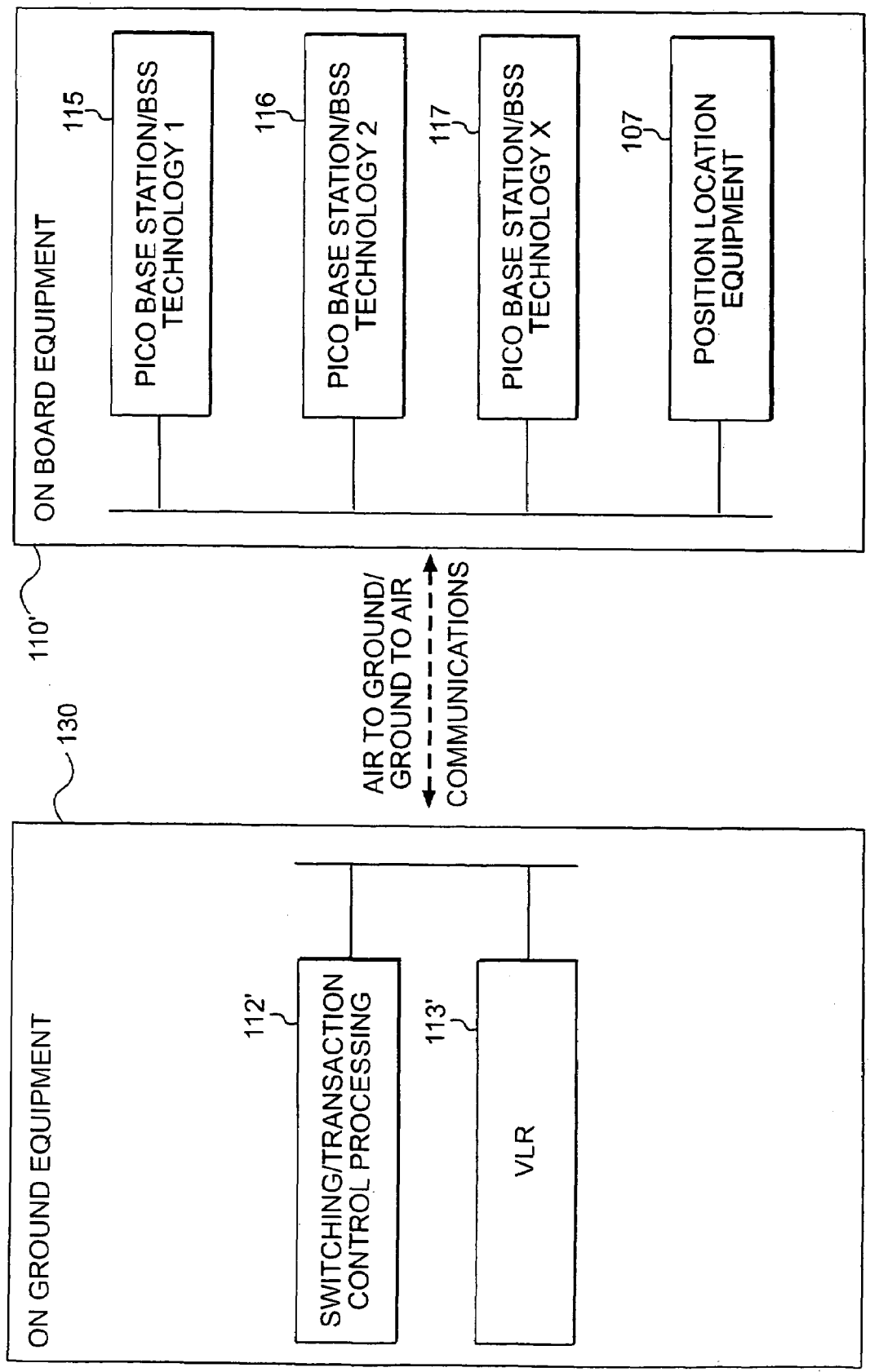
FIG. 1C is a block diagram of the onboard and ground-based equipment used with the system of FIG. 1A.

FIG. 1C shows an alternate embodiment of the equipment that may be used to provide aircraft position location information in conjunction with the airborne communications network 100. In FIG. 1C, the same components as show in FIG. 1B are split in location between onboard the aircraft 101 and on the ground as part of the ground-based network 130. More specifically, onboard equipment 110' includes position location equipment 107 and pico cell base stations 115-117. However, the switching and transaction control functions and the visitor location functions are carried out by switching/transaction control processing module 112' and VLR 113', respectively, both of which are incorporated into the ground-based network 130. This arrangement may be advantageous for small aircraft, such as private aircraft, or small commercial aircraft.

In either the configuration shown in FIG. 1B or the configuration shown in FIG. 1C, the switching/transaction control processing modules 112/112' are configured such that the base stations 115-117 of the onboard equipment 110/110' can receive and transmit multiprotocol wireless communications with a variety of portable devices, such as the handsets 111n. The switching/transaction control processing modules 112/112' are connected to the ground-based network 130 using the wireless network 120. The switching/transaction control processing modules 112/112' may first provide signaling to the base stations 115-117. The base stations 115-117 carry the voice, data, and control messages between the handsets 111n and the switching/transaction control processing modules 112/112'. The VLRs 113/113' contain profile data for the handsets 111n and transient data for each subscriber, including the handsets' on/off status and security parameters.

The VLRs 113/113' may include an authentication center (not shown) that is used to ensure that only properly authorized handsets 111n, and other sources, communicate through the onboard equipment 110. The authentication center provides authentication encryption parameters to ensure that a mobile customer cannot falsely assume the identity of another mobile customer and provides data for encryption of the voice, data, and control signals transmitted via the air between the handsets 111n and the base stations 115-117. Encryption is desirable for the transmission of messages because it is possible to listen in, or tap, the radio channels carrying voice communications.

The onboard equipment 110 also allows intersystem connection to existing wireless and wireline infrastructure using the accepted industry standard protocols such as GSM MAP, ANSI-41, SIP (Session Initiation Protocol), MEGACO (MEdia GAteway COntroller), MGCP (Media Gateway Controller Protocol), or later developed protocol. While it is anticipated the carriage of the communications and the messaging related to this type of connection is IP based, other connectivity mechanisms may be used as relevant to the accepted methods of the industry.

The onboard equipment 110 provides for communications to the base stations 115-117. This connection and communications are achieved and managed based on the appropriate protocols for the individual base station technology. For example in GSM, the appropriate GSM standard protocols are used. Likewise for other industry standard base stations, the accepted standard protocols are used. In the case where a standard protocol is not available, the equipment can employ proprietary protocols to handle the communications. Additionally, there are many new protocols and access methods being introduced into the wireless industry, using SIP (Session Initiated Protocol) and other emerging protocols are covered in this architecture and methodology. Additional connectivity from the onboard switching/transaction control processing module 112 to associated ancillary systems such as billing, management, etc. are all part of the establishment of the communications infrastructure. In alternate configurations where the switching/transaction processing is part of the ground based network, the same communications protocols, interfaces, and logical equipment configurations are possible.

Figure 2:
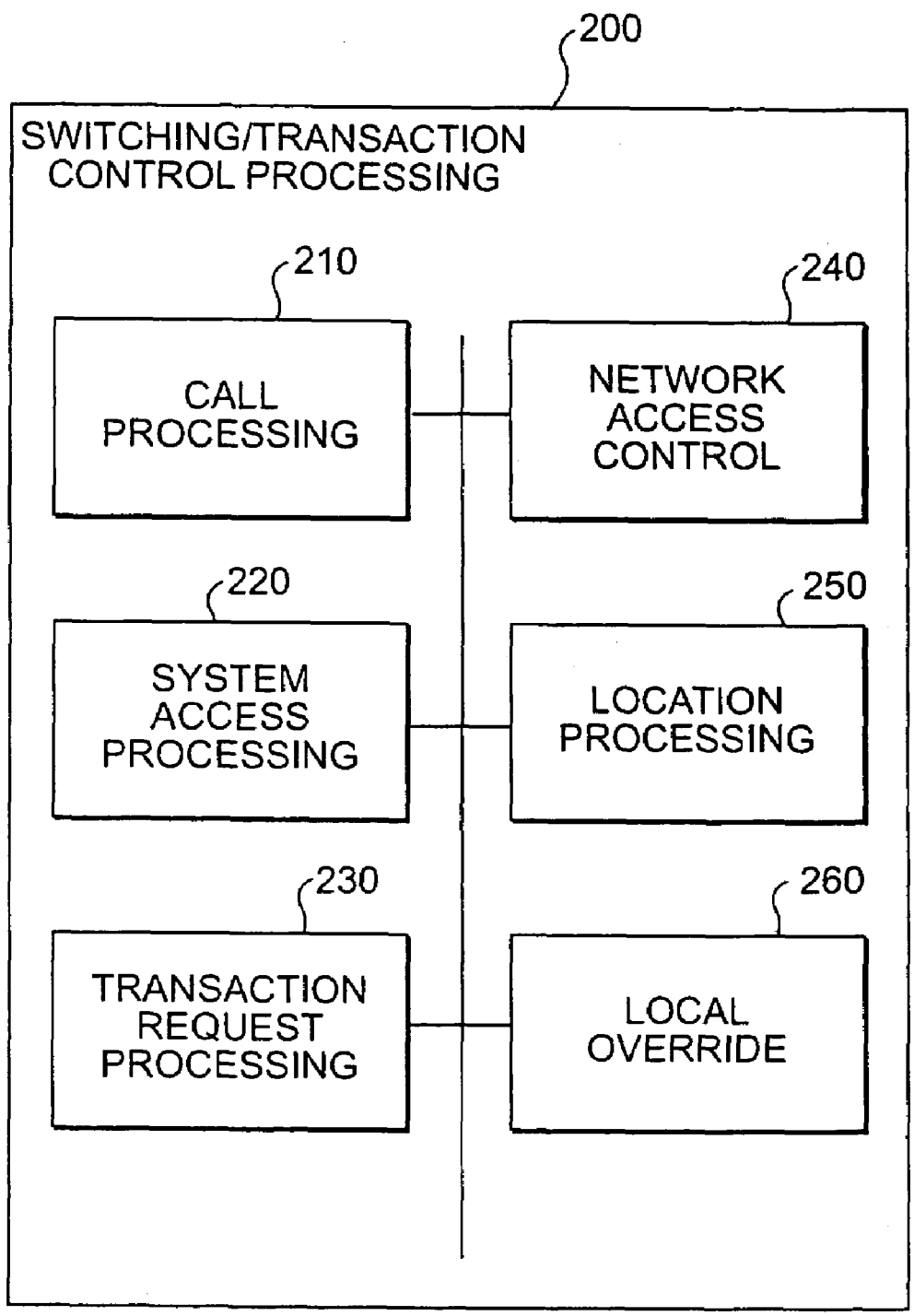
FIG. 2 is a block diagram of a software architecture used with the switching and transaction control processing of FIG. 1B and FIG. 1C.

FIG. 2 is a block diagram of software architecture 200 for switching/transaction processing module 112 of FIG. 1B. A similar architecture would be used with the switching/transaction processing module 112' of FIG. 1C. Although the software architecture 200 is shown concentrated in the switching/transaction control processing module 112, the software architecture 200 may be distributed among the various components shown in FIG. 1B. Alternatively, the software architecture 200 may be installed on a separate control device, processor, or computer (not shown).

In FIG. 2, call processing module 210 handles call setup and teardown control in the system. The call processing module 210 also processes the triggers to know when to collect location information, etc. As used herein, a trigger refers to an event that the call processing module 210, and other components of the system 100, use as an indication to take a specific action. For example, during call setup, a trigger may indicate that the wireless call is an emergency (e.g., 911) call. System access processing module 220 provides the interfaces and control for access from subscriber equipment (e.g., the handsets 111n) to the services provided by the system 100. Transaction request processing module 230 processes the non-voice related services and requests that can be received from the handsets 111n.

Network access control module 240 provides triggered processing for controlling access to the system 100. Whether the access control is for all handsets 111n to be restricted, only a certain set, or no restrictions, the determination of wireless service is controlled by this function. Local override module 250 provides the interface for local personnel (crew members) to issue an enable/disable override for the wireless service.

The network access control module 240 includes logic that suspends or disables wireless service based on aircraft location, including latitude, longitude, altitude, and other aircraft- and flight-related parameters, such as status of aircraft components including, for example aircraft entry doors open or closed. Thus, the network access control module 240 may initiate wireless service suspension between a subscriber who is using the onboard equipment 110 to communicate with a ground-based wireless subscriber when the aircraft 101 entry door closes and may maintain the wireless service suspension until the aircraft 101 reaches a specified altitude, whereupon the network access control module 240 allows subscribers onboard the aircraft 101 to again communicate through the onboard equipment 110 to other wireless devices external to the aircraft 101.

The software architecture 200 also is shown to include a location reference module 260. The location reference module 260 may process raw position location data for the aircraft, correlate raw and processed position location data, and store the processed and correlated data as the aircraft's location over time. The location reference module 260 receives inputs from the GPS 170 through the GPS antenna 105, and receives other aircraft location information from the aircraft's position location equipment 107, which may include, for example, a radar receiver and a dead reckoning analyzer.

The hardware and software components described above allow wireless communications between a subscriber on the aircraft 101 and a ground-based wired or wireless communications device, as well as with another airborne wireless subscriber (such as in aircraft 101'—see FIG. 1A). The hardware and software components also provide aircraft position location, which, in turn is used to suspend and initiate wireless service with the onboard equipment 110.

Figure 3:
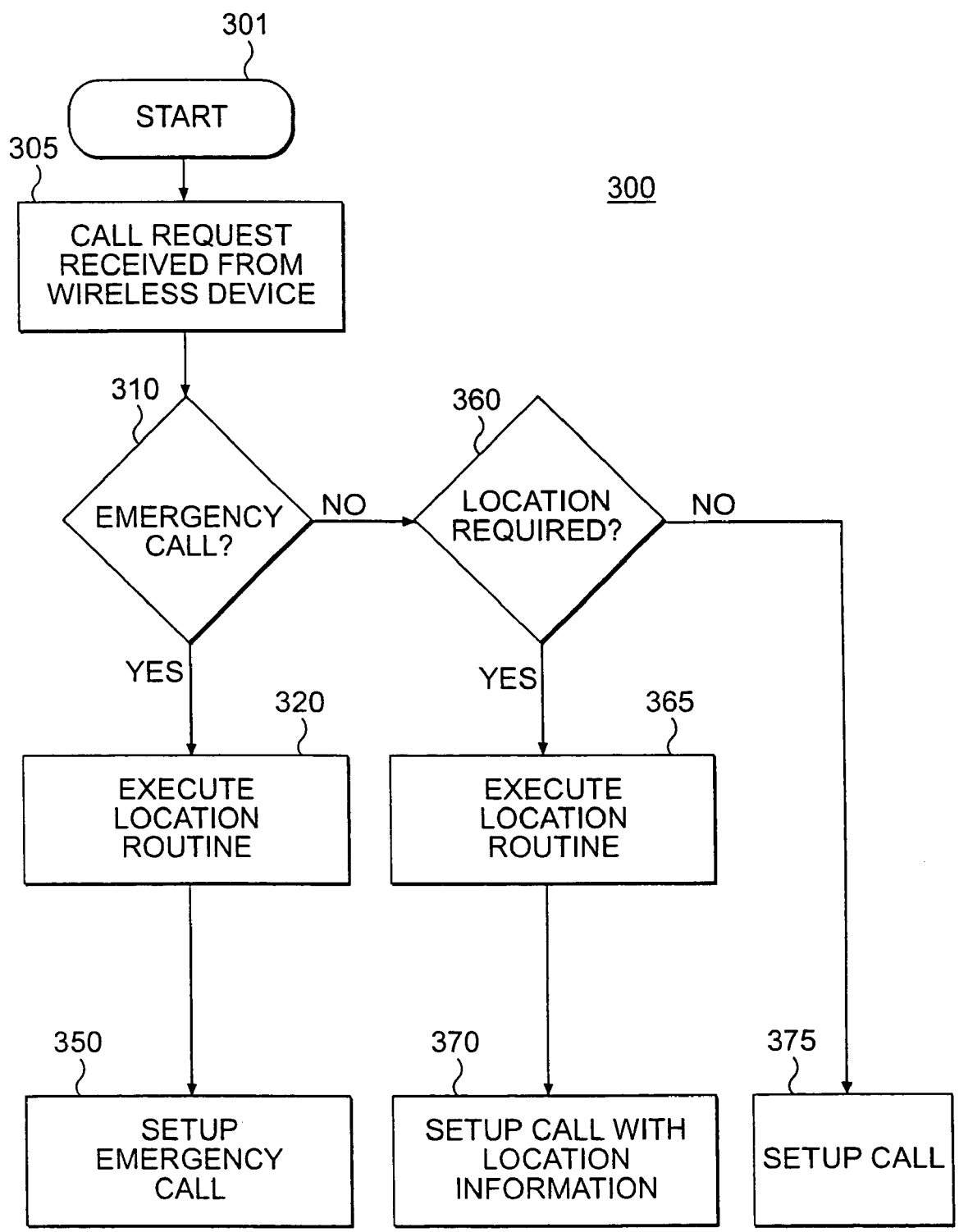
FIG. 3 is a flowchart illustrating an outgoing call routed through the architecture of FIG. 1A.

FIG. 3 is a flowchart illustrating one embodiment of a method for placing a call with the system 100 of FIG. 1A. In FIG. 3, the system 100 is configured to allow wireless calls (i.e., wireless communications are already enabled). The method 300 begins with step 301 when a subscriber onboard the aircraft 101 initiates a wireless call.

In block 305, the onboard equipment 110 receives a call request message from a handset 111a. In block 310, the nature of the call is determined by switching/transaction processing module 112; specifically whether the call is an emergency call. In block 310, if the call is determined to be an emergency call, the method 300 proceeds to block 320, and an aircraft position location routine is executed. The position location routine, when executed, results in a position of the aircraft, which is then sent to the emergency services server 150. Next, in block 350, an emergency call is set up between the subscriber and an appropriate emergency service provider.

In block 310, if the call is determined not to be an emergency call, the method proceeds to block 360, and the switching/transaction processing module 112 determines if aircraft position location information is required to complete the wireless call. If the aircraft's position location information is required, the method 300 proceeds to block 365, and an aircraft position location routine is executed. The position location routine executed at block 365 may be identical to that executed at block 320. Once the aircraft's position is determined, the method 300 proceeds to block 370 and a call to a service provider is set up based on the aircraft location information. The service may simply be another wireless or wired device, or may be a commercial service/information provider.

In block 360, if position location information is not required, the method 300 proceeds to block 375, and a non-emergency call is set up between the subscriber and another party. Following completion of the emergency call or the non-emergency calls, the call ends, and normal wireless call termination procedures are executed.

Figure 4:
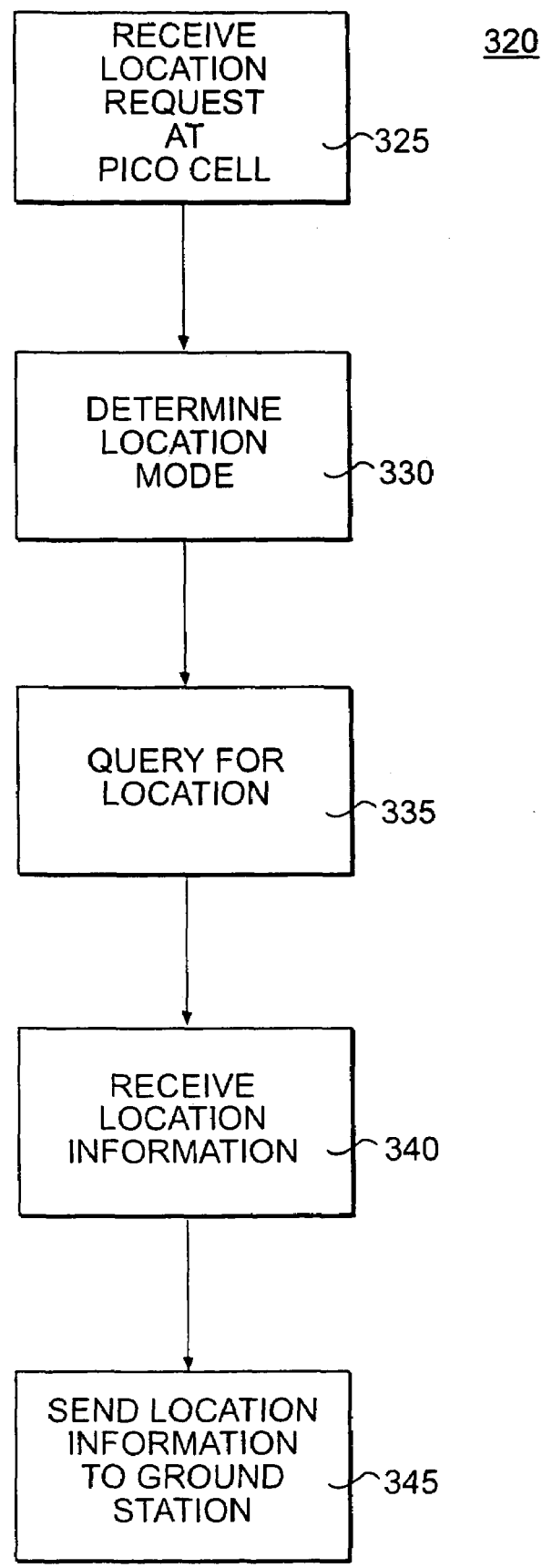
FIG. 4 is a flowchart illustrating a position location routine of the architecture of FIG. 1B.

FIG. 4 is a block diagram of location routine 320. In block 325, the onboard equipment 110 receives a position location request. The ground-based network 130 may make such a request. In block 330, the onboard equipment 110 determines the location mode, that is, the onboard equipment 110 determines if the aircraft's location is to be based on information from the GPS 170, or the onboard position location equipment 107.

In block 335, the onboard equipment 110 initiates a location query, and in block 340 receives the aircraft's location data. In block 345, the aircraft's location is sent to the ground-based network 130.

FIGS. 5-14 illustrate various message flows associated with embodiments of hardware and software components, and the position location and communications methods they provide. The message flows are based on the systems illustrated in FIGS. 1A-2, including the architectures shown in either of FIG. 1B or 1C, and the methods shown in FIGS. 3 and 4. While base station message flows are shown, additional possibilities of this functionality can be driven by aircraft equipment or an existing system tracking the aircraft location. In addition, the message flows may be described as pertaining more appropriately in the context of a commercial airline.

However, the same, or similar, message flows would also pertain to a charter aircraft and a private aircraft.

Figure 5:
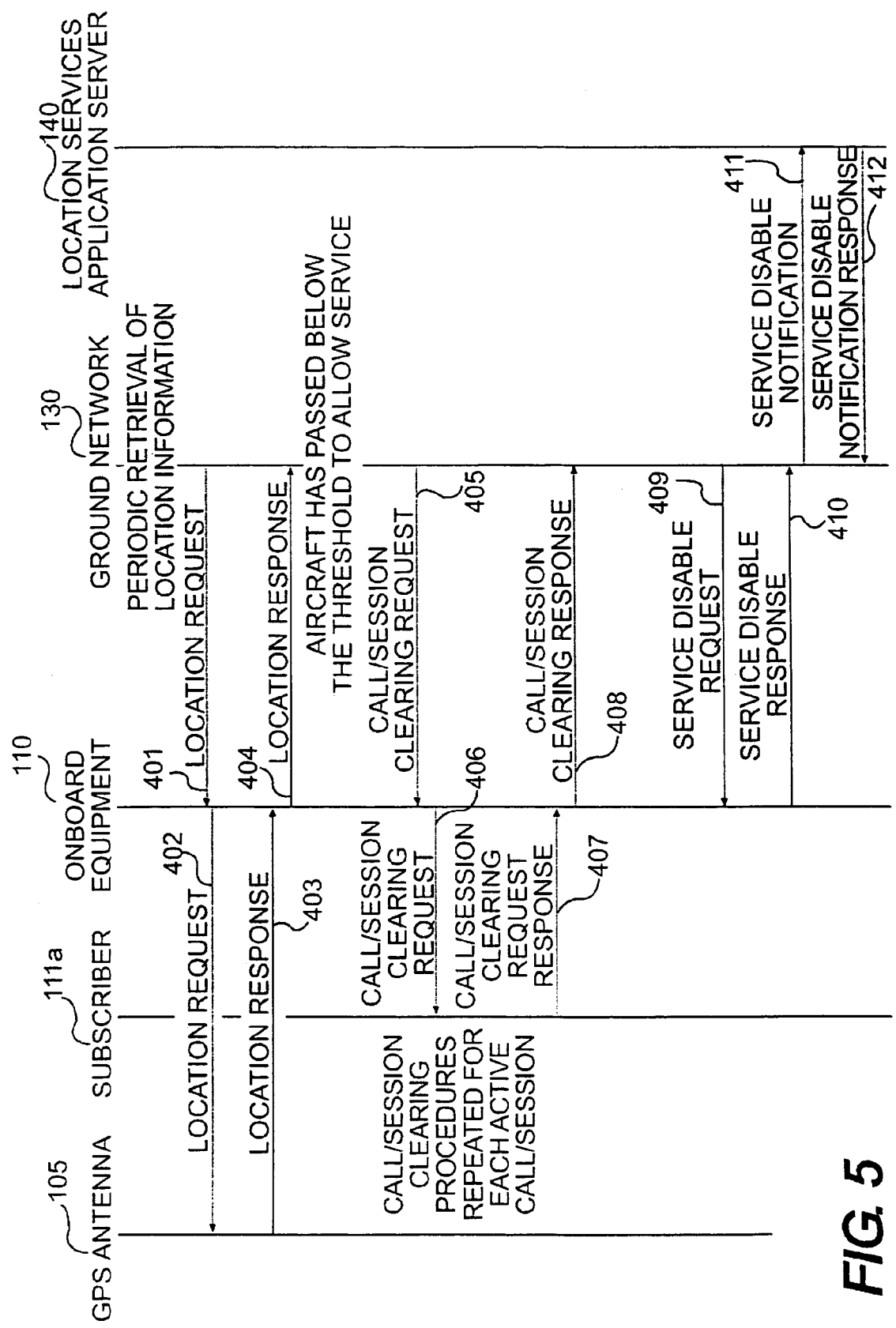
FIGS. 5-14 are message flowcharts illustrating various operations of the system of FIG. 1A.

More specifically, FIGS. 5-8 also show possible scenarios for enabling and disabling wireless service aboard the aircraft 101. FIG. 5 illustrates a message flow in which the ground-based network 130 periodically checks the GPS-based position of the aircraft 101, and initiates a wireless service shutdown procedure when the aircraft 101 has passed a threshold to allow wireless service. The shutdown begins with clearing of existing call sessions followed by disabling subscriber access. The ground-based network 130 may request periodic retrieval of GPS location information. The retrieval begins with location request 401, which may be sent to the onboard equipment 110 from ground-based network 130. The location request 401 may specify the location of a specific handset 111n, or, alternatively, may request the location of the aircraft 101. To acquire the current location, the onboard equipment 110 transmits location request 402, using GPS antenna 105, to GPS 170. The GPS 170 sends location response 403 to the onboard equipment 110. The location response 403 contains current aircraft location, such as latitude and longitude. The onboard equipment 110 then passes the aircraft location to the ground-based network 130 by way of location response 404. However, in the scenario illustrated in FIG. 5, the aircraft 101 may be operating at an altitude at which cellular and other non-aircraft electronic messaging is not permitted. As illustrated, when the aircraft 101 passes the altitude threshold for cellular messaging, the onboard equipment 110 does not permit a call session. Once the altitude threshold has been met, the ground-based network 130 initiates call/session clearing by sending message 405 to the onboard equipment 110, which in turn relays call/session clearing message 406 to the subscriber's handset 111a. The handset 111a returns response message 407 to the onboard equipment 110, which then relays call/session clearing response message 408 to the ground-based network 130, and messaging from the handset 111a terminates. The message flow continues as the ground station sends service disable request message 409 to the onboard equipment 110, which responds by disabling message servicing, and returns service disable response 410 to the ground-based network 130. The ground-based network 130 then notifies the location services application server 140, that service to the aircraft 101 has been disabled. The server 140 may return service disable notification response 412.

In FIG. 5, the aircraft's location information is shown being obtained from the GPS 170 by way of a path through the onboard equipment 110. However, the aircraft's GPS location information could also be obtained directly by the ground-based network 130, or other external ground-based system, or could be obtained by accessing external database or system 185.

Figure 6:
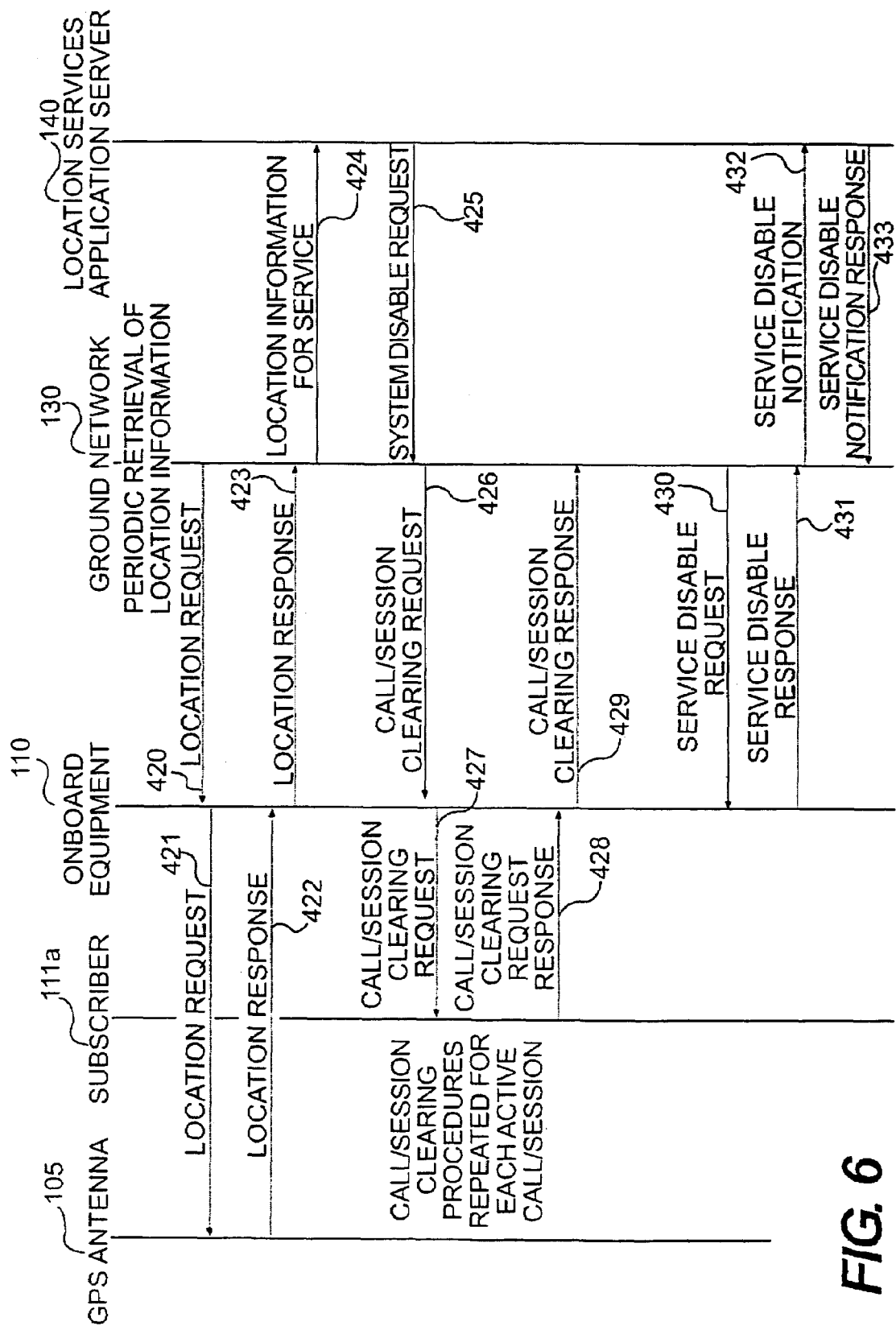

FIG. 6 illustrates a scenario similar to that shown in FIG. 5, except that an external service, such as location services application server 140, determines the status of service. In FIG. 6, a message flow is shown in which the ground-based network 130 periodically checks the GPS-based position of the aircraft 101. Based on the aircraft's location, the external service initiates a service disable procedure. The shutdown begins with clearing of existing call sessions followed by disabling subscriber access. Messages 420-423 establish the aircraft's location using the GPS 170. The location information is then passed from the ground-based network 130 to the external service using message 424. The external service then initiates a service disable operation by sending service disable request 425 to the ground-based network 130. In other respects, the message flows shown in FIG. 6 are similar to or the same as those shown in FIG. 5.

Figure 7:
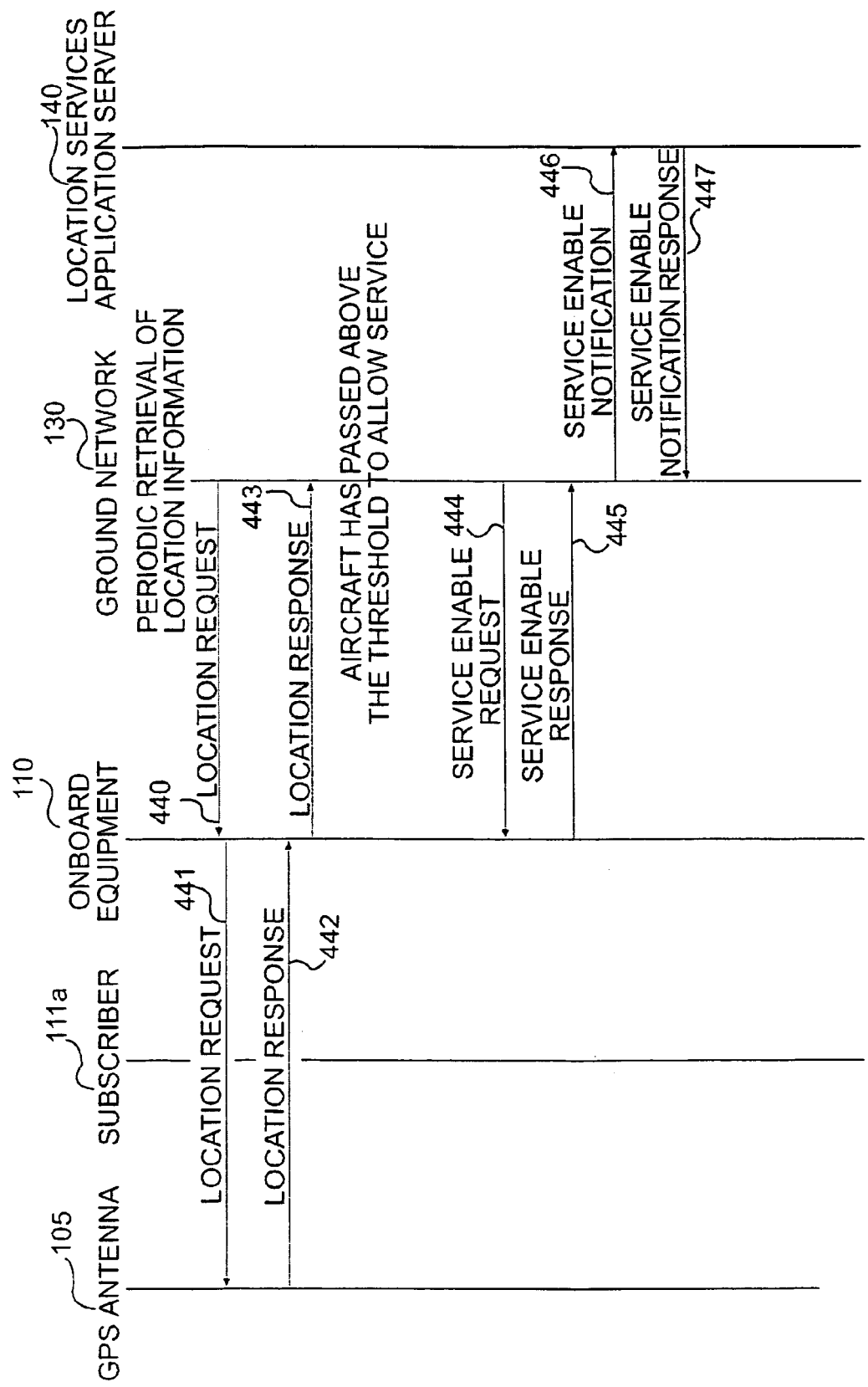

FIG. 7 illustrates a message flow in which wireless services are enabled for handsets 111n onboard the aircraft 101 based on an internal database determination. In FIG. 5, the ground-based network 130 periodically determines aircraft location from the GPS 170 using messages 440-443. Based on the aircraft's flight plan, as contained in a database internal to the ground-based network 130, or, alternatively, based on information contained in external database 185, the ground-based network 30 determines that the aircraft 101 has passed above the threshold altitude for wireless communications. The ground-based network 130 then sends service enable request message 444 to the aircraft 101, and the onboard equipment 110 returns service enable response message 445, indicating that wireless service onboard the aircraft 101 has been enabled. The ground-based network 130 then notifies the location services application server 140, using service enable notification message 446, that wireless service to the handsets 111n is available. The server 140 then returns notification response 447.

Figure 8:
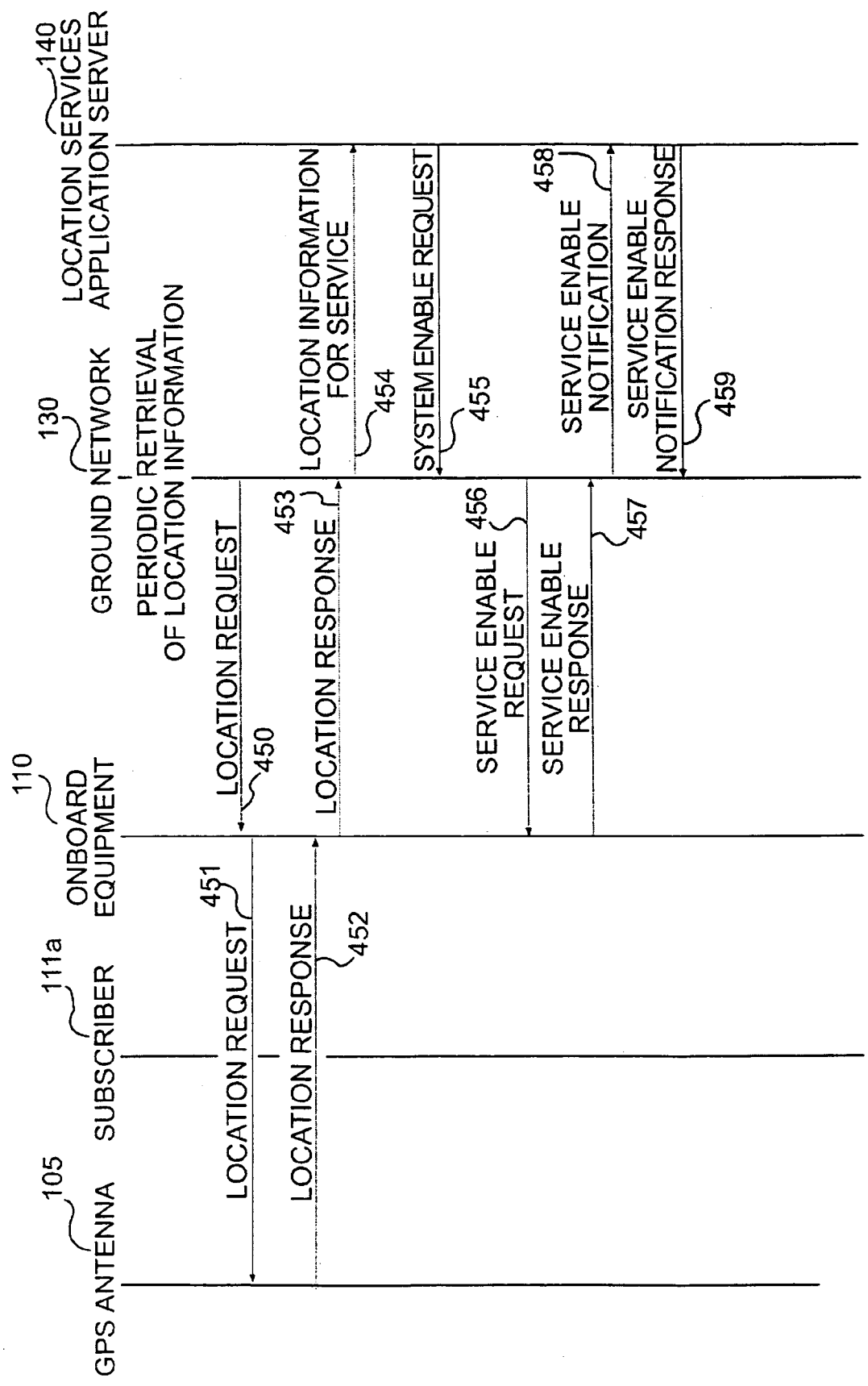

FIG. 8 illustrates a scenario for enabling wireless service similar to that shown in FIG. 7, except that an external service, rather than the ground-based network 130, determines that wireless service is allowable. Messages 450-453 are used to establish the aircraft's current location. The ground-based networks sends the aircraft location to the location services application server 140 using message 454. Based on this location information, the server 140 sends service enable request message 455 to the ground-based network 130, which forwards the service enable request to the aircraft 101 using message 456. The onboard equipment 110 then enables wireless services, and reporting and notification are handled with messages 457-459.

In addition to determinations made at the ground-based station 130 or at other ground-based external systems, enabling and disabling of aircraft wireless service may require that certain aircraft onboard conditions be satisfied. For example, the aircraft 101 may incorporate an aircraft override function that allows the pilot, or an operator at some other restricted location on the aircraft 101, to enable or disable wireless service. Wireless service can also be enabled and disabled based on other factors such as status of the aircraft's exit doors, airport status, and airspace status.

The use of the aircraft's location can be cross-referenced with a database and/or deterministically be used based on altitude or other relevant location related data points to allow onboard wireless service access.

Figure 9:
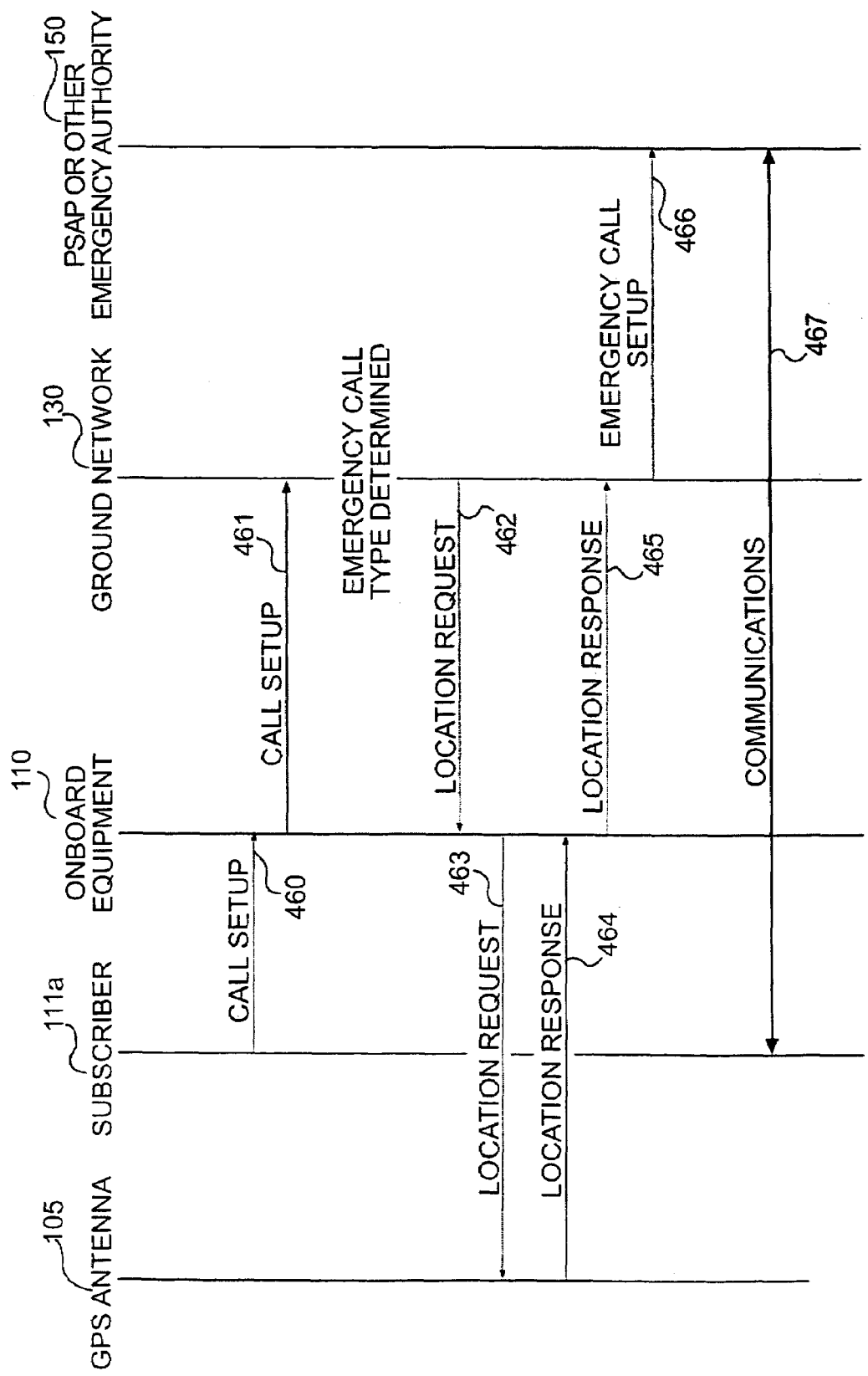
Figure 10:
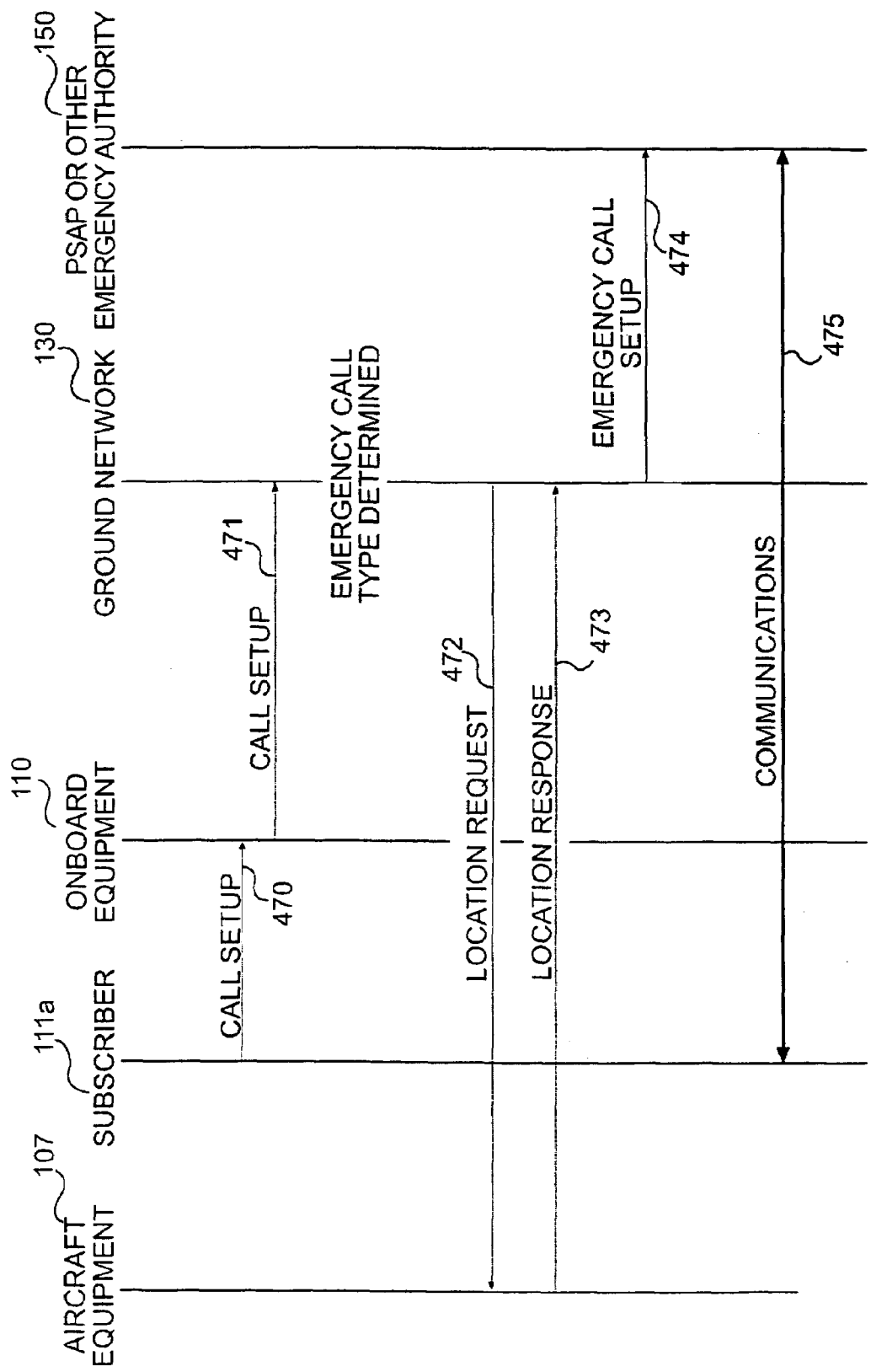
Figure 11:
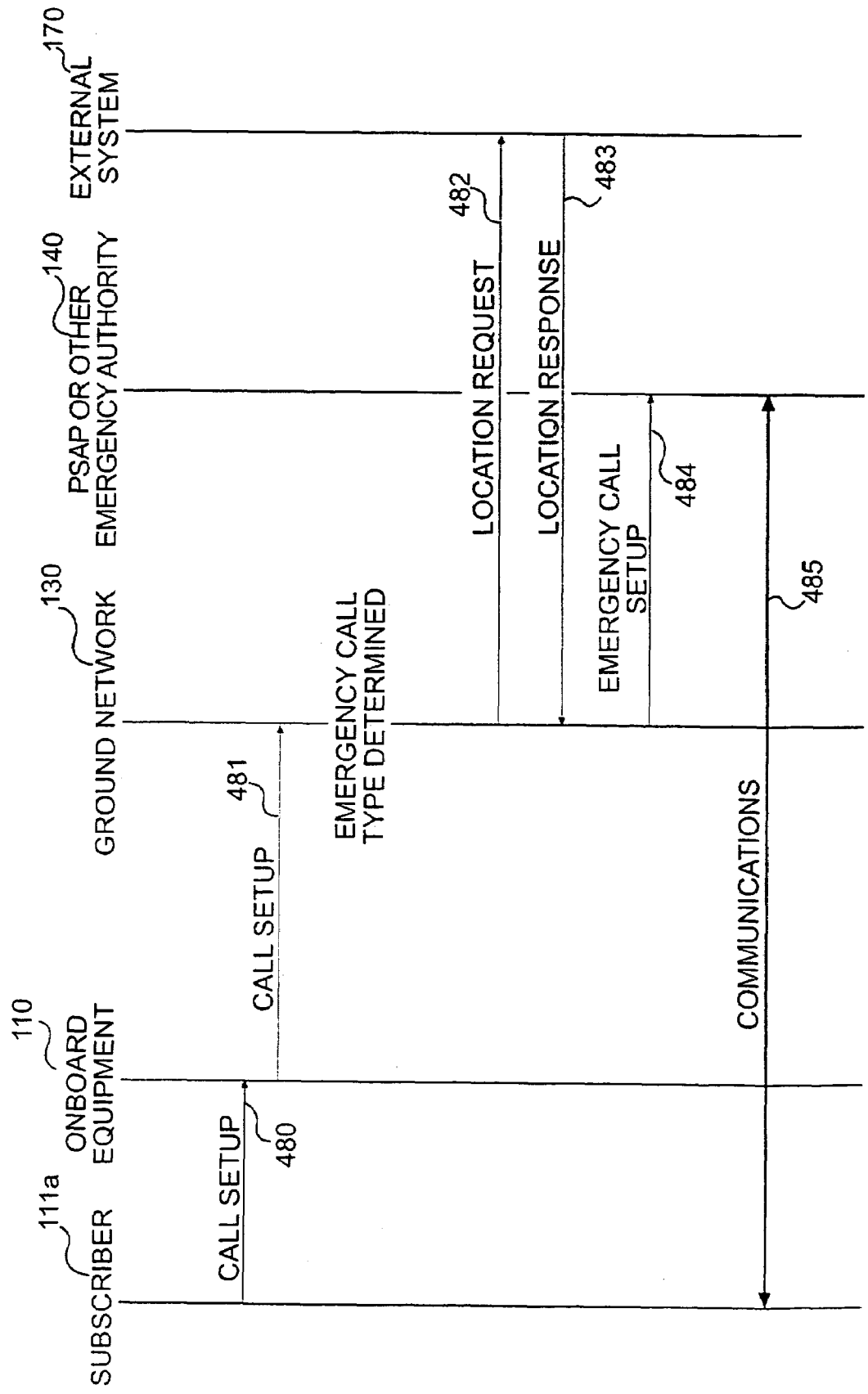

FIGS. 9-11 illustrate message flows associated with emergency call scenarios (i.e., 911 calls). In the scenarios of FIGS. 9-11, wireless service from the aircraft 101 is enabled. When a subscriber onboard the aircraft initiates a call, the switching system (i.e., the call processing/transaction processing entity) determines the type of call, and from this determination, the switching system initiates the appropriate call processing. In the system shown in FIG. 1A, the switching system may be embodied in the ground-based network 130. If the ground-based network determines that the call is an "emergency type" call, the ground-based network 130 initiates special call processing procedures. An "emergency type" call may be identified by the dialed numerals 911, for example. As part of the call setup, the ground-based network 130 initiates a GPS location request that is sent to the aircraft 101.

In one scenario, the onboard equipment 110, being connected to GPS antenna 105, can obtain a reliable GPS location for the aircraft 101, and can then send this location information to the ground-based network 130. The ground-based network 130 receives the location information, converts the location information to the appropriate format, and sends the location information to a public safety access point (PASP—i.e., the 911 emergency server 150). The combination of subscriber identity (as available from the hand set 111a), the cell id (in reality, the aircraft identification) and the aircraft's location (from GPS) are then analyzed to determine the aircraft, flight, and passenger initiating the request.

Returning to FIG. 9, a subscriber 111a initiates a wireless call using the subscriber's hand set, where the initiated call is a 911 call (i.e., the subscriber simply dials 911 and hits the "send" key on the hand set). The subscriber's actions results in sending call setup message 460 to the onboard equipment 110, which in turns sends call setup message 461 to the ground-based network 130. The ground-based network 130 determines the call type; in this case, an emergency or 911 call. The ground-based network 130 next determines the aircraft's location. In the scenario shown in FIG. 9, the ground-based station acquires the aircraft's location through messages 462-465, in which the onboard equipment obtains the location information from the GPS 170. In addition to the aircraft location information, the ground-based station may also obtain an identification of the subscriber's hand set 111a (provided, for example, as part of the call setup information sent with call setup message 460), and an identification of the aircraft's onboard equipment 110 (i.e., the cell ID). The ground-based network may then correlate the location information, hand set ID, and cell ID to identify the passenger initiating the 911 call. This information is then sent to emergency server 150 using emergency call setup message 466, and communications 467 are established between the subscriber 111a and the emergency server 150.

FIG. 10 illustrates message flows associated with an emergency call scenario in which the ground-based network 130 establishes the aircraft's location by querying (message 472) other equipment onboard the aircraft 101, such as position location equipment 107. The position location information 107 can include any conventional equipment for tracking the location of an aircraft, including dead reckoning, radar tracking, TACAN, and other means. Other message flows in this scenario are similar to those shown in FIG. 9.

In addition to querying the aircraft's position location equipment 107, the ground-based network can obtain the aircraft's position by other means, such as indirectly through database 185, and from the GPS 170 by way of the location services application server 140. Message flows associated with this scenario are shown in FIG. 1, where in response to an emergency call from the subscriber 111a, the ground-based network sends a location request to the external system 180, and the location information is provided to the ground-based network by reference to the database 185. Once the aircraft's location is established at the ground-based network, the ground-based network initiates an emergency call setup (message 484), and wireless communications are established between the subscriber 111a and the emergency server 150.

In addition to the services offered for emergency calls, other location-based applications will be able to function on board the aircraft. The basic concept of the plane location representing the subscriber location still applies. Other potential services could push data to, or pull data from the subscriber or device based on the location. For example, the location of the subscriber's aircraft could be used when arranging ground-based transportation and other services, thereby eliminating the need to wait for an airline to update a message board or Internet Web site with flight arrival time. The location of the aircraft can also be connected to the service provided on board. When combined with the ability to turn on or off service in the cabin based on location, the aircraft can now control the usage and the accessibility of services. Vendors can also use the subscriber's pending arrival to send out greetings and other advertisements to attract the subscriber's business. This technology and concept can be extended to RFID and the tracking of packages, providing a more exact location and arrival time determination. Other applications as possible through the use of location id in an airborne network.

Figure 12:
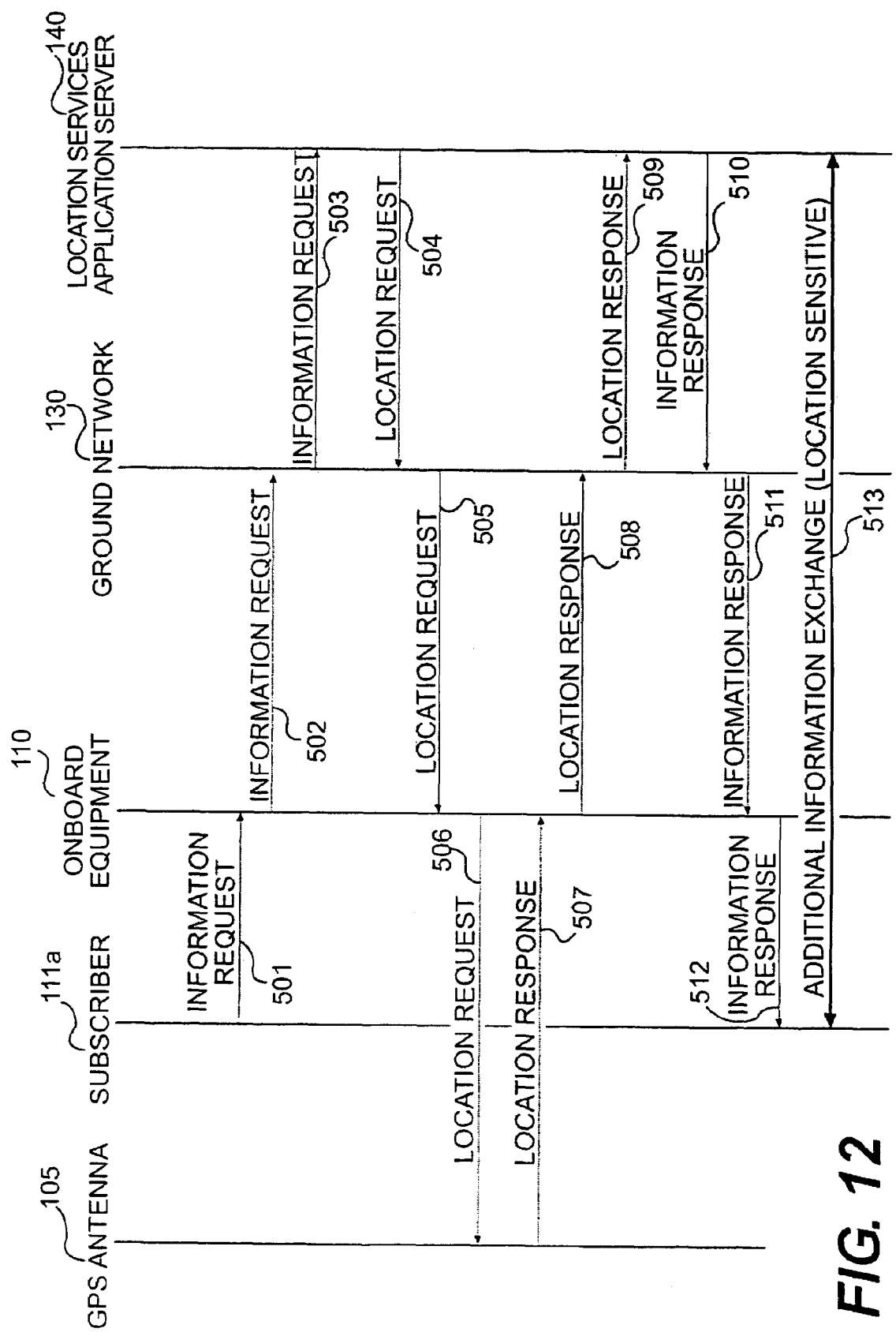
Figure 13:
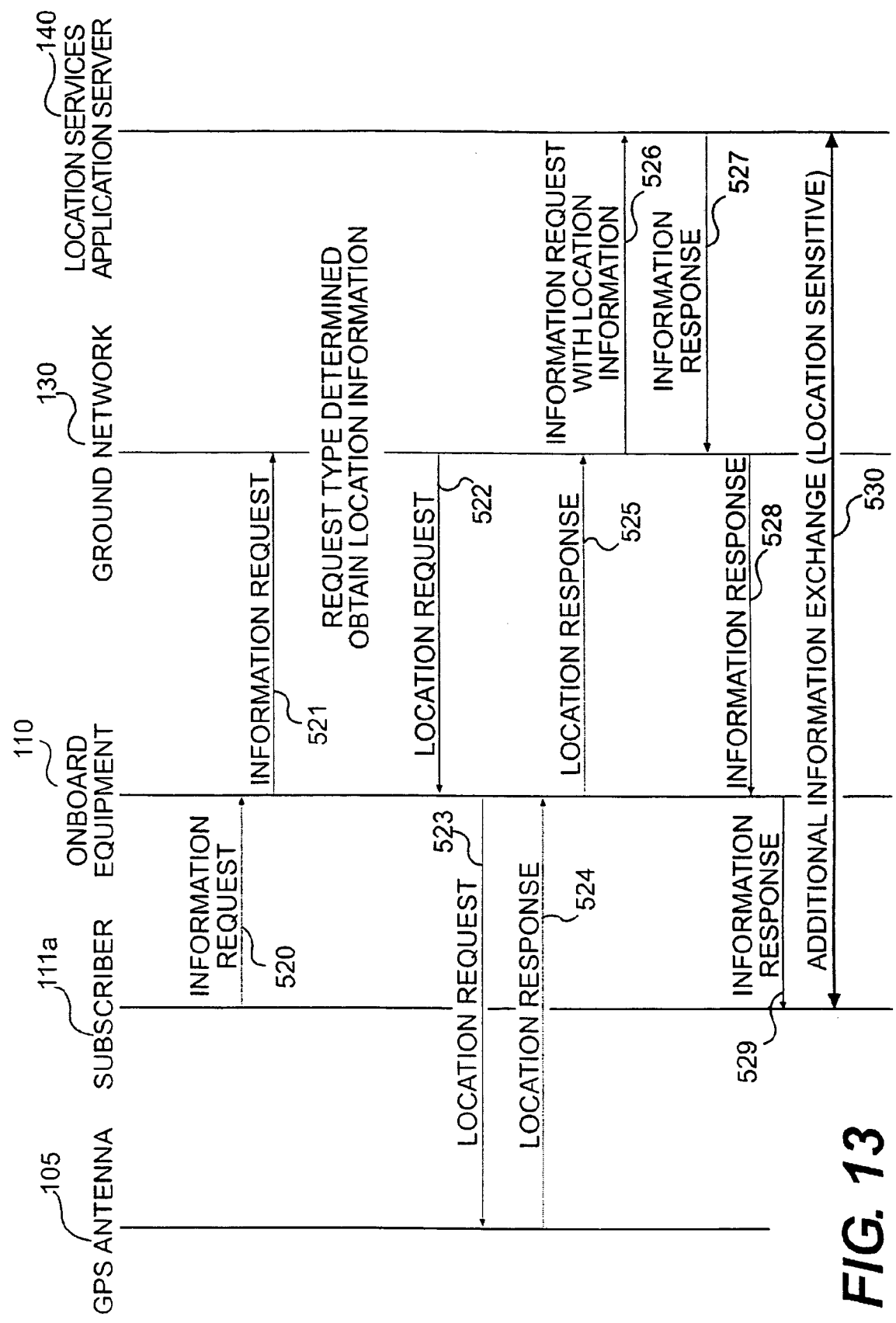
Figure 14:
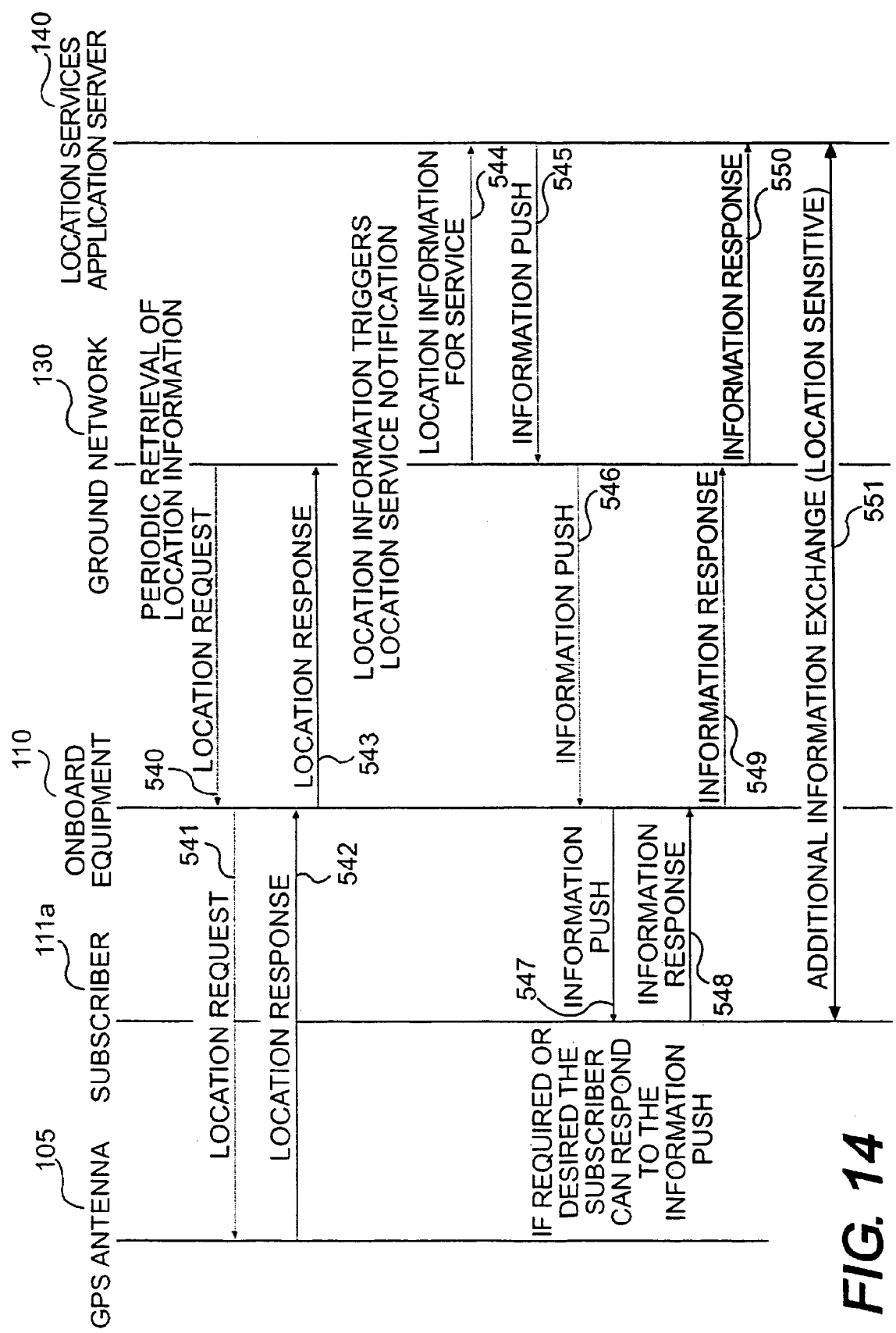

FIGS. 12-14 illustrate message flows associated with providing the above-described, and other, location-based services to subscribers 111n onboard the aircraft 101. More specifically, FIG. 12 illustrates message flows associated with a scenario in which the subscriber 11a requests a specific service or information, and the requested service or information can be combined with the aircraft's present location to provide a targeted response.

In FIG. 12, the subscriber 111a initiates an information request by sending information request 501 from the subscriber's hand set. The message 501 is received at the aircraft's onboard equipment 110, which in turn formulates and sends information request 502 to the ground-based network 130. the ground-based network 130 then sends information request 503 to the location services application server 140, which determines if aircraft location information will b required. If aircraft location information is needed to respond to the subscriber's information request, the location services application server 140 sends location request 504 to the ground-based network 130, which passes the location request to the aircraft using message 505. Upon receipt of the message 505, the onboard equipment 110 sends location request 506 to the GPS 170, using GPS antenna 105, and receives location response message 507 in reply. The onboard equipment 110 sends location response 508 to the ground-based network 130, which in turn sends the location information to the location services application server 140. The server 140 then returns information response 510 to the ground-based network 130, and the information is relayed to the subscriber 111a through messages 511 and 512. The subscriber 111a and the server 140 are then able to communicate, 513, to exchange additional information. Although the scenario shown in FIG. 12 relies on base station to GPS for location information, other methods and means for providing aircraft location, such as noted above with respect to FIGS. 1A-4 are equally applicable.

FIG. 13 illustrates message flows associated with a scenario in which a subscriber 111a requests a specific service, or information. That request, combined with the subscriber's current location, is then used to provide a targeted response. In FIG. 13, the ground-based network determines the need to collect location information before sending the service/information request to the location services application server 140. In particular, the subscriber's service/information request 520 is received at the onboard equipment 110, and relayed 521 to the ground-based station, which determines the nature of the request and the need for current subscriber location. To obtain the subscriber's location, the ground-based network 130 initiates and receives location messages (522-525). Once it has the subscriber's location, the ground-based network 130 combines that information with the subscriber's service/information request, and send message 526 to the location services application server 140, which results in information response messages 527-529, and allows for additional messaging 530 between the subscriber 111a and the location services application server 140.

The information provided in the information response messages 527-529 may be targeted to the specific subscriber 111a considering, for example, a subscriber-specific profile, subscriber information contained in the VLR 113, the subscriber's specific location, and other information related to the aircraft's flight profile.

FIG. 14 illustrates message flows associated with a scenario in which information is pushed to the subscriber 111a based on the aircraft's location. The message flows begin with a periodic aircraft position location request 540 initiated by the ground station 130. The onboard equipment 110 receives the location request and initiates a query 541 from the GPS 170. The GPS position is then relayed to the ground station (542-543). When received at the ground station 130, the aircraft's location data triggers an information service notification 544 to the location services application server 140. For example, the aircraft's location may be within 100 nautical miles of the aircraft's intended location, which event triggers an update to an airline Web page that provides current flight status and triggers an update to airport flight status monitors. The location may also cause the ground station 130 to notify various service providers, such as rental car companies, taxi cab companies, hotels operating shuttle buses, limousine companies, and other commercial service and information providers that the aircraft 101 is nearing its destination, along with an estimated time until the aircraft reaches is arrival gate. The location may also be used to notify various airport services, such as to ensure that the arrival gate is clear, refueling operations are available, and cleaning crews are on standby, for example.

The notification can also be used to trigger the commercial services to push information to subscribers onboard the aircraft 101. For example, a hotel may provide information about special room rates or package deals that would coincide with a specific subscriber's stay in the aircraft's destination city; a limousine service could advertise its car services and rates to various destinations; an amusement part could advertise its attractions.

The location services application server 140 receives inputs from commercial services by way of the non-emergency services server 160, and pushes the information 545 to the ground-based network 130. The information is then pushed to a specific subscriber 111a (546-547). If desired, the subscriber 111a can respond 548 to the information push. Such a response is sent (549, 550) to the location services application server 140. In addition, the subscriber 111a may establish a wireless communication 551 with a commercial service.

The invention claimed is:

1. A wireless communications system for use with an aircraft, comprising:
   airborne base station equipment mounted on the aircraft, the base station equipment capable of communication with wireless devices used by subscribers on the aircraft and with one or more wireless communications networks;
   switching/transaction processing equipment capable of communication with the base station equipment;
   aircraft location equipment capable of communication with the base station equipment, wherein the aircraft's geographic location, including latitude, longitude, and altitude, is determined; and
   a wireless communications enable/disable module that receives the aircraft's location and enables and disables wireless communications.

2. The system of claim 1, further comprising a ground-based network, wherein the switching/transaction processing equipment is located at the ground-based network.

3. The system of claim 1, further comprising another airborne wireless communications system, wherein subscribers on the aircraft communicate with subscribers on another aircraft.

4. The system of claim 1, wherein the switching/transaction processing equipment is located onboard the aircraft.

5. The system of claim 1, wherein the base station equipment comprises a plurality of base stations, each base station capable of processing wireless communications according to one or more specific wireless protocol, standard, or application.

6. The system of claim 5, wherein the wireless protocols include GSM, CDMA, TDMA and AMPS, and wherein the standards include IEEE 802.11, 802.16, UMTS, IS-136, IS-95, and IS-533.

7. The system of claim 1, wherein the aircraft location equipment comprises a base station antenna in communication with the base station equipment.

8. The system of claim 1, wherein the communications network comprises a wireless communications network located on the aircraft, wherein the subscribers on the aircraft are able to communicate with each other using the wireless devices.

9. The system of claim 1, wherein the communications network comprises a wireless communications network located on a plurality of aircraft, wherein the subscribers on the aircraft are able to communicate with other subscribers on other aircraft using the wireless devices.

10. The system of claim 1, wherein the aircraft location information includes attitude, heading, and speed over ground.

11. The system of claim 1, wherein the aircraft location equipment comprises aircraft onboard equipment including one or more of TACAN, a dead reckoning analyzer, a GPS receiver, and a radar receiver.

12. The system of claim 2, wherein aircraft location based on the aircraft onboard equipment is stored in a database internal to the aircraft.

13. The system of claim 2, wherein aircraft location based on the aircraft onboard equipment is stored in a database external to the aircraft.

14. The system of claim 1, wherein the aircraft location equipment comprises off board equipment including satellites, ground location equipment, and external location systems.

15. The system of claim 14, wherein the ground location equipment comprises ground-based equipment including one or more of a GPS receiver, a radar receiver, TACAN, and an external database.

16. The system of claim 1, further comprising:
    an emergency services server; and
    a first communications link coupling the emergency services server to one or more of the ground-based networks, and the ground-based network comprises decision logic to determine when a call placed from a wireless device used onboard the aircraft is an emergency call, wherein a ground-based network routes the emergency call to the emergency services server over the first communications link.

17. The system of claim 1, further comprising:
    a non-emergency services server; and
    a second communications link coupling the non-emergency services server to one or more of the ground-based networks, and the non-emergency services server comprises links to one or more non-emergency services available at the aircraft's intended destination.

18. The system of claim 1, wherein the enable/disable module is located at the airborne equipment.

19. The system of claim 18, wherein the enable/disable module comprises an aircraft entry door interlock, wherein wireless communications between the wireless devices and the airborne base station is disabled based on a combination of a closed entry door indication and aircraft altitude below a minimum threshold.

20. The system of claim 18, wherein the enable/disable module comprises a cockpit override input, wherein in override, wireless communications between the wireless devices and the airborne base station are disabled.

21. The system of claim 1, wherein the enable/disable module is located at a ground-based network.

22. The system of claim 21, wherein the enable/disable module comprises an aircraft entry door interlock, wherein wireless communications between the wireless devices and the airborne base station is disabled based on a combination of a closed entry door indication and aircraft altitude below a minimum threshold.

23. The system of claim 11, wherein the enable/disable module comprises a control tower input, wherein in override, wireless communications between the wireless devices and the airborne base station are disabled.

24. The system of claim 1, wherein the enable/disable module comprises:
   an airport status input; and
   an airspace status input, wherein wireless communications between the wireless devices and the airborne base station are disabled based on the airport and airspace status inputs.

25. The system of claim 1, wherein the enable/disable module comprises:
   a service barring submodule; and
   a full radio frequency shutdown submodule.

26. The system of claim 1 wherein the determined aircraft's location further includes the aircraft's attitude, speed over ground, and heading.

27. The system of claim 1 wherein the wireless communications enable/disable module enables and disables wireless communications based on the aircraft's location.

28. A position location system for an airborne wireless communications network, comprising:
   means for routing wireless communications between wireless handsets onboard an aircraft and wireless facilities on ground;
   means for locating the aircraft; and
   means for enabling the wireless communications between the routing means and the handsets.

29. The system of claim 28, wherein the locating means comprises:
   onboard location means for establishing the aircraft's position based on onboard instrumentation;
   external location means for establishing the aircraft's position based on instruments external to the aircraft; and
   external database means for establishing the aircraft's position.

30. The system of claim 29, wherein the enabling means comprises:
   means for receiving the aircraft's position;
   means for receiving aircraft status information including entry door status;
   means for receiving airport and airspace status information; and
   means for correlating the aircraft position, aircraft status, and airport and airspace status to determine if wireless service can be enabled.

31. The system of claim 29, further comprising a non-emergency services server that receives the aircraft's position and couples commercial services and information to wireless subscribers onboard the aircraft based on the received aircraft's position.

32. The system of claim 29, further comprising an emergency services server that receives the aircraft's position and couples emergency services to wireless subscribers onboard the aircraft based on the received aircraft's position.

33. The system of claim 28 wherein means for locating the aircraft determines the aircraft's latitude, longitude and altitude.

34. A wireless communications method for wireless communications between wireless handsets onboard an aircraft and wireless devices on ground, comprising:
   determining a geographic location of the aircraft comprising aircraft latitude, longitude, and altitude;
   providing the location to a wireless communications enabling device;
   based on the provided location, enabling wireless communications with an airborne base station;
   receiving, at the airborne base station, a wireless call-up from a wireless handset onboard the aircraft; and
   establishing wireless communications between the handset and a device external to the aircraft.

35. The method of claim 34, further comprising:
   determining a type of call from the wireless handset, wherein if the call type is an emergency call, coupling the wireless handset to an emergency services server, and wherein if the call type in a non-emergency call, coupling the wireless handset to a called address.

36. The method of claim 32, wherein the called address is a commercial service.

37. The method of claim 31, further comprising:
   notifying, based on the provided location, one or more commercial services;
   receiving, from the one or more commercial services, information of potential interest to one or more subscribers onboard the aircraft; and
   pushing the information to the one or more subscribers.

38. The method of claim 34, wherein the enabling step further comprises:
   receiving aircraft, airport, and airspace status information; and
   correlating the received aircraft, airport, and airspace status information and the provided location when enabling the wireless communications.

39. The method of claim 34, further comprising providing a cockpit override to enable and disable the wireless communications.

40. The method if claim 34, wherein enabling the wireless communications comprises enabling full radiofrequency operation.

41. The method of claim 34, wherein enabling the wireless communications comprises enabling communications only with the airborne base station.

42. The method of claim 34 wherein the determining a location of the aircraft determines the aircraft's latitude, longitude and altitude.

43. A method for establishing an aircraft position location for use in an airborne wireless communications network, comprising:
 sending an aircraft location request to an aircraft;
 determining a geographic location of the aircraft, including latitude, longitude, and altitude;
 providing the location to a wireless communications enabling device; and
 based on the provided location, enabling wireless communications with an airborne base station.

44. The method of claim 43 wherein the determining a location of the aircraft determines the aircraft's latitude, longitude and altitude.

* * * * *